(12) United States Patent
Suzuki et al.

(10) Patent No.: US 7,098,960 B2
(45) Date of Patent: Aug. 29, 2006

(54) DATA SLICER, DATA SLICING METHOD, AND AMPLITUDE EVALUATION VALUE SETTING METHOD

(75) Inventors: Akihiro Suzuki, Osaka (JP); Keiichi Kuzumoto, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 547 days.

(21) Appl. No.: 10/611,433

(22) Filed: Jul. 2, 2003

(65) Prior Publication Data

US 2004/0095510 A1   May 20, 2004

(30) Foreign Application Priority Data

Jul. 2, 2002 (JP) .............................. 2002-192954

(51) Int. Cl.
  *H04N 7/00* (2006.01)
(52) U.S. Cl. ...................................... 348/465; 348/470
(58) Field of Classification Search ................ 348/465, 348/470; H04N 7/00
  See application file for complete search history.

(56) References Cited

U.S. PATENT DOCUMENTS

| | | | |
|---|---|---|---|
| 4,222,073 A | 9/1980 | Hirashima | 358/145 |
| 5,483,289 A * | 1/1996 | Urade et al. | 348/468 |
| 5,517,249 A | 5/1996 | Rodriguez-Cavazos et al. | 348/465 |
| 5,666,167 A | 9/1997 | Tults | 348/465 |
| 5,715,011 A | 2/1998 | Bramwell | 348/465 |
| 6,462,782 B1 | 10/2002 | Honda et al. | 348/465 |
| 6,839,091 B1 * | 1/2005 | Hebbalalu et al. | 348/465 |
| 6,912,009 B1 * | 6/2005 | Orii | 348/465 |
| 2002/0008776 A1 | 1/2002 | Kuzumoto et al. | |
| 2002/0090204 A1 * | 7/2002 | Matsumoto | 386/84 |
| 2003/0179316 A1 * | 9/2003 | Morooka | 348/468 |
| 2003/0184677 A1 * | 10/2003 | Kuzomoto et al. | 348/465 |
| 2004/0041944 A1 * | 3/2004 | Matsumoto | 348/465 |

FOREIGN PATENT DOCUMENTS

WO   WO 98/51069   11/1998

OTHER PUBLICATIONS

M. Sablatash et al., "Comparisons and Improvements of Design of Data Slicers and Clock Synchronization Circuits for Broadcast Teletext Decoders Operating in a Multipath Environment" IEEE Transactions on Broadcasting, IEE Inc. New York, US, vol. 34, No. 3, Sep. 1, 1988, pp. 381-397.

* cited by examiner

*Primary Examiner*—Brian P. Yenke
(74) *Attorney, Agent, or Firm*—Steptoe & Johnson LLP

(57) ABSTRACT

A data slicer 300 includes a slice level calculation unit 310 that determines whether a detected digital video signal is a CRI signal on the basis of the amplitude of the signal, and sets a reference slice level and upper and lower slice levels which are obtained by providing offset in the reference slice level, by using only the CRI signal; a data slicing unit 160 that binarizes a digital video signal S140 using the slice levels; a decoding circuit 170 that converts binarized serial data into parallel data; and a data selection unit 320 that selects data including no error from the decoded data, and outputs the selected data through a video signal output terminal 190. Therefore, even when the video signal is distorted, this data slicer can set appropriate slice level data to binarize the video signal, thereby suppressing the occurrence rate of decoding errors.

14 Claims, 12 Drawing Sheets

DATA SLICER, DATA SLICING METHOD, AND AMPLITUDE EVALUATION VALUE SETTING METHOD

FIELD OF THE INVENTION

The present invention relates to a data slicer, a data slicing method, and an amplitude evaluation value setting method and, more particularly, to a data slicer, a data slicing method, and an amplitude evaluation value setting method for calculating a slice level that enables to binarize a video signal into a proper value.

BACKGROUND OF THE INVENTION

As a method for transmitting data utilizing serial transmission, there is a character broadcast system by which character broadcast data are transmitted in vertical blanking intervals of video signals.

There are various kinds of character broadcast systems that employ different superimposition lines upon which character broadcast data (character broadcast serial data) are superimposed, or transmission clocks of different frequencies, and various kinds of analog video signals on which the character broadcast serial data are superimposed are transmitted at present in various regions over the world.

A character broadcast analog video signal (see S140 in FIG. 11) is a signal including a horizontal sync signal A that indicates start of a horizontal blanking interval, a color burst signal B for color reproduction, a clock run-in (hereinafter, referred to as CRI) signal C that is a reference waveform and employed to set a slice level for binarizing a signal, a framing code signal D that indicates the character broadcast type, and a text data signal E including character broadcast data to be transmitted. Hereinafter, a period in which the slice level is set on the basis of the CRI signal C is referred to as a CRI detection period, a period in which the frame code signal D is received is referred to as a framing code period, and a period in which the text data signal E is received is referred to as a text data period.

The data unit of the character broadcast serial data is composed of 8 bits, and one bit among these 8 bits is a parity bit that is added to detect the presence or absence of decoding errors. The character broadcast system employs a method by which the presence or absence of decoding errors is checked on the basis of whether or not an odd number of "1" are included in each unit of decoded data, and accordingly data of 8 bits which include an odd number of "1" are transmitted. Thus, when actual data includes only an even number of "1", the parity bit is set at "1", so that each data unit includes an even number of "1".

When characters that are superimposed upon such an analog video signal are to be displayed, the received analog video signal is initially binarized by a data slicer to extract character broadcast data in accordance with a transmission clock, thereby extracting character broadcast serial data.

Hereinafter, the construction and operation of the conventional data slicer will be described with reference to FIG. 10.

As shown in FIG. 10, the conventional data slicer 500 includes an A/D converter 120 for converting an analog videosignal S110 inputted through a video signal input terminal 110, upon which character broadcast serial data are superimposed, into a digital video signal S120; a CRI detection unit 130 for generating a CRI detection range signal S132 that indicates a CRI detection period on the basis of the digital video signal S120; a low-pass filter (hereinafter, referred to as LPF) 140 that eliminates noises from the digital video signal S120 and outputs a digital video signal S140; a slice level calculation unit 510 that sets a slice level on the basis of the digital video signal S140 which is inputted during the CRI detection period; a data slicing unit 220 that binarizes the digital video signal S140, using the slice level that is set by the slice level calculation unit 510; and a decoding circuit 230 that converts the binarized serial data into parallel data to perform a decoding process, and outputs decoded data S230 to outside the data slicer 500 through a video signal output terminal 190.

The CRI detection unit 130 includes a sync separation circuit 131 that separates a vertical sync signal S131a and a horizontal sync signal S131b from the digital video signal S120; and a CRI detection range signal generation circuit 132 that outputs a CRI detection range signal S132 that indicates a predetermined line and position as a detection period for a CRI signal C, on the basis of the vertical sync signal S131a and the horizontal sync signal S131b.

The slice level calculation unit 510 includes a falling detection circuit 151 that outputs a falling detection pulse S151 when detecting a falling of the digital video signal S140 in the CRI detection period; a frequency calculation circuit 152 that calculates the frequency of the digital video signal S140 on the basis of the falling detection pulse S151, and outputs frequency data S152; a frequency evaluation circuit 153 that compares the frequency data S152 with previously-held frequency data of a CRI signal C for the character broadcast system, and outputs a frequency evaluation gate pulse S153 during a period in which the frequency data S152 corresponding to a predetermined character broadcast system are outputted; and a CRI evaluation circuit 154 that extracts a pulse corresponding to a falling of the predetermined character broadcast system from the fall detection pulse S151, and outputs a frequency evaluation pulse S154. The slice level calculation unit 510 further includes a maximum/minimum retrieval circuit 155 that retrieves the maximum and minimum values of the amplitude of the digital video signal S140 during the CRI detection period, and outputs maximum value retrieval data S155a and minimum value retrieval data S155b; and an average calculation circuit 511 calculating the average amplitude of the digital video signal S140 on the basis of the maximum value retrieval data S155a and the minimum value retrieval data S155b, with employing the frequency evaluation pulse S154 as a load pulse, and outputs the calculated average as slice level data S511 to the data slicing unit 220.

The data slicing unit 220 includes a binarization circuit 221 that performs threshold evaluation using the slice level data S511 (i.e., determines whether the digital video signal S140 is larger or smaller than the slice level data S511) to binarize the digital video signal S140, and outputs binarized data S221 to an extraction circuit 222; and an extraction circuit 222 that extracts character broadcast serial data from the binarized data S221 in timing of an extraction pulse S162 that is generated by an extraction pulse generation circuit 162, and outputs extracted serial data S222.

Next, the operation of the conventional data slicer 500 that is constructed as described above will be described with reference to figures.

A timing chart that illustrates the operation of the conventional data slicer 500 is shown in FIG. 11. In FIG. 11, the same or corresponding elements as those in FIG. 10 are denoted by the same reference numerals. Further, reference character A denotes a horizontal sync signal, B denotes a color burst signal, C denotes a CRI signal, D denotes a framing code signal, E denotes a text data signal, and T31 to T36 denote times when signals included in the digital video signal S140 vary.

When an analog video signal S110 upon which character broadcast serial data are superimposed is inputted through the video signal input terminal 110, the A/D converter 120 samples the analog video signal S110 using a sampling clock fs (MHz) to convert the same into a digital signal, and outputs the digital video signal S120 to the CRI detection unit 130 and the LPF 140. Then, the LPF 140 eliminates noises from the digital video signal S120, and outputs a resultant digital video signal S140 to the slice level calculation unit 510 and the data slicing unit 220. FIG. 11 shows an example of the digital video signal S140 that is obtained by A/D-converting the analog video signal S110 and eliminating noises therefrom. In this FIG. 11, black dots show the digital video signal S120 (S140) which is obtained by sampling the analog video signal S110 using the sampling clock fs.

At time T31, the digital video signal S120 including a horizontal sync signal A and a vertical sync signal is inputted to the CRI detection unit 130. Then, the sync separation circuit 131 separates a vertical sync signal S131a and a horizontal sync signal S131b from the digital video signal S120.

Next, the CRI detection range signal generation circuit 132 obtains a start position (time T32) and an end position of the CRI signal C on the basis of the vertical sync signal S131a and the horizontal sync signal S131b, and outputs a CRI detection range signal S132 to the fall detection circuit 151 and the maximum/minimum retrieval circuit 155 during the CRI detection period.

During a predetermined time period in the period while the CRI detection range signal S132 is outputted, the digital video signal S140 including the CRI signal C is inputted to the slice level calculation unit 510, and then the slice level calculation unit 510 performs a slice level calculation process on the basis of the inputted CRI signal C. To calculate the slice level, the falling detection circuit 151 retrieves fallings of the digital video signal S140, and the maximum/minimum retrieval circuit 155 retrieves the maximum and minimum values of the digital video signal S140, and outputs maximum value retrieval data S155a and minimum value retrieval data S155b.

At time T33, the falling detection circuit 151 detects a first falling of the CRI signal C, and outputs a falling detection pulse S151 to the frequency calculation circuit 152 and the CRI evaluation circuit 154. At time T34, the falling detection circuit 151 detects the second falling of the CRI signal C, and outputs the falling detection pulse S151 to the frequency calculation circuit 152 and the CRI evaluation circuit 154.

Then, the frequency calculation circuit 152 calculates the frequency of the CRI signal C from the falling detection pulses S151 which are detected at times T33 and T34, and outputs frequency data S152 to the frequency evaluation circuit 153. On the basis of the frequency data S15, the frequency evaluation circuit 153 determines whether the falling that is detected by the falling detection circuit 151 corresponds to a signal that is compliant with the predetermined character broadcast system or not. For example, when a falling due to noises is detected, the frequency data S152 is different from the frequency of the character broadcast system, and thus the frequency evaluation circuit 153 determines that this is frequency data which is not compliant with the predetermined character broadcast system. When the frequency data S152 is the frequency of the predetermined character broadcast system, the frequency evaluation circuit 153 outputs the frequency evaluation gate pulse S153 to the CRI evaluation circuit 154.

Then, on the basis of the frequency evaluation gate pulse S153, the CRI evaluation circuit 154 determines whether the falling detection pulse S151 is a pulse that is compliant with the character broadcast system or not. The falling detection pulse S151 during a period in which the frequency evaluation gate pulse S153 is outputted is a pulse that is compliant with the character broadcast CRI signal C, and the CRI evaluation circuit 154 extracts the corresponding pulse and outputs the frequency evaluation pulse S154 to the average calculation circuit 511.

The average calculation circuit 511 samples the maximum value retrieval data S155a and the minimum value retrieval data S155b, with utilizing the frequency evaluation pulse S154 as a load pulse, and calculates the average value of the CRI signal C. Then, the average calculation circuit 511 outputs the calculated average value to the data slicing unit 220 as slice level data S511. Here, a slice level SLV10 which is set on the basis of the slice level data S511 is an appropriate slice level that can be employed when the framing code signal D and the text data signal E are binarized after time T35.

When the digital video signal S140 including the framing code signal D is inputted to the data slicing unit 220 at time T35, the binarization circuit 221 determines whether the digital video signal S140 is higher or lower than the slice level data S511 to binarize the signal into "0" or "1", thereby generating binarized data S221. Then, the extraction circuit 222 extracts character broadcast serial data from the binarized data S221, in accordance with an extraction pulse S162 that is outputted from the extraction pulse generation circuit 162, and outputs extracted serial data S222. The decoding circuit 230 converts the extracted serial data S222 into parallel data, and obtains a framing code.

When the digital video signal S140 including a text data signal E is inputted to the data slicing unit 220 at time T36, the binarization circuit 221 binarizes the digital video signal S140 using the slice level data S511, to generate binarized data S221, like in the case including the framing code signal D. Then, the extraction circuit 222 extracts character broadcast serial data from the binarized data S211 in accordance with the extraction pulse S612, and outputs the extracted serial data S222 to the decoding circuit 230. The decoding circuit 230 converts the extracted serial data S22 into parallel data, then carries out a decoding process depending on the type of the character broadcast, which is indicated by the framing code, and outputs decoded data S230 through the video signal output terminal 190.

The decoded data that are outputted from the video signal output terminal 190 are transferred to a display circuit (not shown), and displayed as characters.

However, the analog video signal S110 that is inputted from the video signal input terminal 110 may include distortion resulting from group delay or reduction in electric field strength in a transmission system. The conventional data slicer is adversely affected by noises due to the distortion, and accordingly, when the analog video signal S140 is distorted, the accuracy of the slice level data S511 that is calculated by the slice level calculation unit 510 is lowered, whereby an appropriate slice level data S511 cannot be obtained.

Consequently, the binarization circuit 211 binarizes the digital video signal S140 into an incorrect value, so that the occurrence rate of decoding errors gets higher at the decoding process for the binarized data S211.

Hereinafter, a description will be given of the operation of the conventional data slicer 500 in a case where a distorted analog video signal S110 is inputted thereto, with reference to the drawings.

FIG. 12 shows the operation of the conventional data slicer 500 in the case where an analog video signal S110 that is distorted due to group delay or reduction in the electric field strength is inputted thereto. In FIG. 12, the same or corresponding elements as those in FIG. 11 are denoted by the same reference numerals. Reference characters T41 to T46 denote times when signals included in the digital video signal vary.

When the analog video signal S110 is inputted through the video signal input terminal 110, the A/D converter 120 converts the analog video signal S110 into a digital signal, and outputs the digital video signal S120 to the CRI detection unit 130 and the LPF 140. Then, the LPF 140 eliminates noises from the digital video signal S120, and outputs a resultant digital video signal S140 to the slice level calculation unit 510 and the data slicing unit 220. FIG. 12 shows an example of the digital video signal S140 that is obtained by A/D-converting the distorted analog video signal S110 and eliminating noises from the converted signal. Further, reference character C' denotes noises which occur during a period in which the CRI detection range signal S132 is outputted, and cannot be eliminated by the LPF 140. The reason why the digital video signal S140 is distorted even when the noise elimination is performed by the LPF 140 is that this video signal is affected by noises that cannot be eliminated even by the LPF 140. Further, black dots in FIG. 12 show the digital video signal S120 (S140) which is obtained by sampling the analog video signal S110 using the sampling clock fs.

At time T41, the digital video signal S120 including a horizontal sync signal A and a vertical sync signal is inputted to the CRI detection unit 130, and then the sync separation circuit S131 separates the vertical sync signal S131a and the horizontal sync signal S131b from the digital video signal S120.

At time T42, the CRI detection range signal generation circuit 132 obtains a start position and an end position of the CRI signal C on the basis of a vertical sync signal S131a and a horizontal sync signal S131b, and outputs a CRI detection range signal S132 during the CRI detection period.

While the CRI detection range signal generation circuit 132 is outputting the CRI detection range signal S132, the slice level calculation unit 510 calculates a slice level on the basis of the CRI signal C. While the CRI detection range signal S132 is being inputted to the slice level calculation unit 510, the falling detection circuit 151 retrieves a falling of the digital video signal S140, and the maximum/minimum retrieval circuit 155 retrieves the maximum and minimum values of the digital video signal 140.

At time T43, the falling detection circuit 151 erroneously detects a falling of the noises C' in the digital video signal S140 as a falling of the CRI signal C, and generates a falling detection pulse S151. Also at time T44, the falling detection circuit 155 erroneously detects a falling of the noise C' in the digital video signal S140 as a falling of the CRI signal C, and generates a falling detection pulse S151.

Then, the frequency calculation circuit 152 calculates the frequency of the digital video signal S140 on the basis of the falling detection pulses that are detected at time T43 and T44, and output frequency data S152. On the basis of the calculated frequency data S152, the frequency evaluation circuit 153 determines whether the failings that are detected by the falling detection circuit 151 correspond to a signal that is compliant with the predetermined character broadcast system or not. When the interval between failings of noises C' is equal to the interval between failings of the CRI signal C, like the digital video signal S140 shown in FIG. 12, the frequency evaluation circuit 153 erroneously determines that the frequency of the noises C' is a frequency that is compliant with the predetermined character broadcast system, and outputs the frequency evaluation gate pulse S153 to the CRI evaluation circuit 154. Further, on the basis of the frequency evaluation gate pulse S153, the CRI evaluation circuit 154 erroneously determines that the falling detection pulse S151 is a pulse which is compliant with the character broadcast, and outputs a frequency evaluation pulse S154.

The average calculation circuit 511 samples the maximum value retrieval data S155a and the minimum value retrieval data S155b, using the frequency evaluation pulse S154 as a load pulse, and calculates the average value of the noise C' in the CRI signal C. Then, the average calculation circuit outputs the calculated average to the data slicing unit 220 as slice level data S511. A slice level SLV11 that is set on the basis of the slice level data S511 calculated using the noise C' is lower than the slice level SLV10 that is set using the CRI signal C including no distortion.

At times T45 and T46, the CRI signal C is detected. The falling detection circuit 151 detects the first falling of the CRI signal C at time T45, then detects the second falling of the CRI signal C at time T46, and outputs falling detection pulses S151. The maximum/minimum retrieval circuit 155 retrieves the maximum and minimum values of the digital video signal S140, and outputs maximum value retrieval data S155a and minimum value retrieval data S155b. In the digital video signal S140 shown in FIG. 12, the maximum value of the noises C' is smaller than the minimum value of the CRI signal C, so that the minimum value retrieval data S155b is not updated by the CRI signal C, and thus the minimum value of the noises C' is continuously outputted.

As the frequency that is calculated by the frequency calculation circuit 152 on the basis of the falling detection pulses that are detected at times T45 and T46 is a frequency conforming to the character broadcast system, the frequency evaluation pulse S154 is inputted to the average calculation circuit 511. The average calculation circuit 511 samples the maximum value retrieval data S155a and the minimum value retrieval data S155b using the frequency evaluation pulse S154 as a load pulse, and calculates the average value of the digital video signal S140. Then, the average calculation circuit outputs the calculated average to the data slicing unit 220 as slice level data S511.

However, since the minimum value retrieval data S155b is the minimum value of the noise C', a slice level SLV12 that is set on the basis of the slice level data S511 is improperly lower than an appropriate level. Consequently, the binarization circuit 211 performs binarization using the slice level data that is lower than the appropriate level, so that it may binarize the framing code signal D and the text data signal E into improper values. Accordingly, when extracted serial data S222 that are extracted from binarized data S221 in accordance with an extraction pulse S162 are decoded by the decoding circuit 230, decoding errors may occur.

Further, as the slice level calculation is performed only in the CRI detection period, improper slice level data are obtained when the shape of the digital video signal S140 varies after the CRI signal C. Consequently, the binarization circuit 221 binarizes the signal into an improper value, whereby the probability of occurrence of decoding errors is increased.

Further, when a waveform equalization filter is used to correct distortion of the waveform in the transmission system, the circuit scale is so large that the circuit scale of the data slicer is adversely increased.

SUMMARY OF THE INVENTION

The present invention has for its object to provide a data slicer, a data slicing method, and an amplitude evaluation value setting method, which can suppresses the occurrence rate of decoding errors even when distortion occurs in a digital video signal due to group delay or reduction in the electric field strength in the transmission system.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a data slicer comprising: an A/D conversion unit for converting an input signal including data which are transmitted in serial, into a digital signal; a slice level data calculation unit for calculating plural pieces of slice level data for binarizing the digital signal, on the basis of the digital signal; a binarization unit for binarizing the digital signal using the plural pieces of slice level data, to be converted into plural binarized signals; an extraction pulse generation unit for generating an extraction pulse to be used for extracting the data from the binarized signals; an extraction unit for extracting the data from the binarized signals in accordance with the extraction pulse, thereby generating plural pieces of serial data; a decoding unit for decoding the plural pieces of serial data, thereby generating plural pieces of decoded data; and a decoded data selection unit for selectively outputting decoded data including no error, from among the plural pieces of decoded data. Therefore, a data signal can be binarized into a correct value using one of the plural pieces of the slice level data, and accordingly the data can be correctly extracted even when distortion resulting from group delay or reduction in electric field strength occurs in the data signal, thereby suppressing the occurrence rate of decoding errors.

According to a 2nd aspect of the present invention, in the data slicer of the 1st aspect, the input signal is a signal having a reference waveform of a predetermined cycle, and this data slicer includes: a maximum/minimum retrieval unit for retrieving maximum and minimum values of the digital signal; and a reference cycle detection unit for determining whether a cycle of the digital signal is the cycle of the reference waveform or not, and the slice level data calculation unit calculates the plural pieces of the slice level data, on the basis of an average value and an amplitude of the digital signal, which are calculated from the maximum and minimum values when the reference waveform cycle is detected. Therefore, the reference waveform is detected on the basis of the cycle of the input signal, whereby the slice level data can be obtained by using the detected reference waveform.

According to a 3rd aspect of the present invention, in the data slicer of the 2nd aspect, the slice level data calculation unit employs the calculated average value as reference slice level data, and calculates upper slice level data by adding an offset value that is decided on the basis of the calculated amplitude, to the reference slice level data, and lower slice level data by subtracting the offset value from the reference slice level data. Therefore, the slice level data according to the signal shape can be obtained.

According to a 4th aspect of the present invention, in the data slicer of the 1st aspect, the input signal is a signal of character broadcast that is transmitted being superimposed upon a vertical blanking interval of a video signal. Therefore, the signal of character broadcast is binarized, and data included in the signal are extracted, whereby the received character broadcast signal can be displayed.

According to a 5th aspect of the present invention, there is provided a data slicer comprising: an A/D conversion unit for converting an input signal including a reference waveform of a predetermined cycle and amplitude, into a digital signal; a reference cycle detection unit for determining whether a cycle of the digital signal is the cycle of the reference waveform or not; a maximum/minimum retrieval unit for retrieving maximum and minimum values of the digital signal; an amplitude evaluation unit for determining whether an amplitude of the digital signal, which is calculated from the retrieved maximum and minimum values, is the amplitude of the reference waveform or not; a slice level data calculation unit that employs an average value of the digital signal, which is calculated from the maximum and minimum values when detecting the cycle and amplitude of the reference waveform, as slice level data; and a binarization unit for binarizing the digital signal into the slice level data, to be converted into a binarized signal. Therefore, by detecting the reference waveform on the basis of the amplitude, when noises having a cycle that is similar to that of the reference waveform are detected as the reference waveform, slice level data can be obtained only using the detected reference waveform, with excepting the amplitude or average value obtained from the noises.

According to a 6th aspect of the present invention, in the data slicer of the 5th aspect, the maximum/minimum retrieval unit retrieves maximum and minimum values of the digital signal in each cycle, and the amplitude evaluation unit determines whether the amplitude calculated from the maximum and minimum values in each cycle is the amplitude of the reference waveform or not. Therefore, even when the reference waveform is changed, slice level data that are appropriate to the signal shape can be obtained on the basis of the detected amplitude in each cycle and the average value thereof.

According to a 7th aspect of the present invention, in the data slicer of the 5th or 6th aspect, when calculating the average value from the maximum and minimum values, the slice level calculation unit carries out an averaging process for the calculated average and the slice level data that has been calculated in a previous cycle, and updates the slice level data on the basis of the obtained average. Therefore, even when the reference waveform is changed, slice level data that are appropriate to the signal shape can be obtained on the basis of the average value in each cycle.

According to an 8th aspect of the present invention, in the data slicer of the 5th aspect, the reference waveform and the data signal correspond to a signal of character broadcast which is transmitted being superimposed upon a vertical blanking interval of a video signal. Therefore, the signal of character broadcast is binarized and then data included in the signal are extracted therefrom, whereby the received signal of character broadcast can be displayed.

According to a 9th aspect of the present invention, there is provided a data slicer comprising: an A/D conversion unit for converting an input signal of a predetermined cycle and amplitude, including data which are transmitted in serial, into a digital signal; a reference cycle detection unit for determining whether a cycle of the digital signal is the predetermined cycle or not; a maximum/minimum retrieval unit for retrieving maximum and minimum values of the digital signal; an amplitude evaluation unit for determining whether an amplitude of the digital signal, which is calculated from the retrieved maximum and minimum values, is the predetermined amplitude or not; a slice level data calculation unit for calculating plural pieces of slice level data on the basis of an average value and an amplitude of the digital signal, which are calculated from the maximum and minimum values at a time when the predetermined cycle and amplitude are detected; a binarization unit for binarizing the digital signal using the plural pieces of slice level data, to be converted into plural binarized signals; an extraction pulse generation unit for generating an extraction pulse to be used for extracting the data from the binarized signals; an extraction unit for extracting the data from the plural binarized signals in accordance with the extraction pulse, thereby generating plural pieces of serial data; a decoding unit for decoding the plural pieces of serial data, thereby generating plural pieces of decoded data; a decoded data selection unit for detecting an error from the plural pieces of decoded data, and selectively outputting one of the decoded data when errors are detected from all of the decoded data, or decoded data including no error when there are decoded data in which no error is detected; an error count unit for counting errors in the data outputted from the decoded data selection unit; and a controller for controlling the evaluation in the amplitude evaluation unit on the basis of the output from the error count unit. Therefore, when a desired signal is detected on the basis of the cycle and amplitude of the digital signal and thereby noises of a predetermine cycle are detected as the desired signal, slice level data can be obtained only on the basis of the desired signal, with excepting the amplitude or average value obtained from the noises. Further, as plural pieces of slice level data are calculated, the data signal can be binarized into a correct value using one of the plural pieces of slice level data, whereby even when distortion occurs in the data signal due to group delay or reduction in electric field strength, the data can be correctly extracted, thereby further suppressing the occurrence rate of decoding errors.

According to a 10th aspect of the present invention, in the data slice of the 9th aspect, the input signal includes a reference waveform for calculating the slice level data, this data slicer includes a reference waveform detection unit for detecting the reference waveform, the reference cycle detection unit evaluates the cycle of the digital signal in a period when the reference waveform is detected, the maximum/minimum retrieval unit retrieves the maximum and minimum values of each cycle in the period when the reference waveform is detected, and the amplitude evaluation unit determines whether the amplitude calculated from the maximum and minimum values in each cycle is the predetermined amplitude or not. Therefore, the slice level data can be obtained on the basis of the reference waveform.

According to an 11th aspect of the present invention, in the data slicer of the 9th aspect, the input signal includes a reference waveform for calculating the slice level data, a unit of the data is composed of predetermined bits, this data slicer includes: a reference waveform detection unit for detecting the reference waveform; a data unit detection unit for outputting a data unit detection pulse at intervals of the data unit, on the basis of the decoded data, the maximum/minimum retrieval unit retrieves the maximum and minimum values in each cycle in a period when the reference waveform is detected, while retrieving the maximum and minimum values in each data unit on the basis of the data unit detection pulse in a period when the decoded data are outputted, and the amplitude evaluation unit determines whether the amplitude calculated from the maximum and minimum values in each cycle or each data unit is the predetermined amplitude or not. Therefore, slice level data are calculated using not only the reference waveform but also the data signal, whereby even when the signal shape of the input signal is changed after the calculation of the slice level data on the basis of the reference waveform, slice level data according to the signal shape can be obtained and thus the occurrence rate of decoding errors can be further suppressed.

According to a 12th aspect of the present invention, in the data slicer of the 10th or 11th aspect, the slice level data calculation unit employs the average value as reference slice level data, decides an offset value on the basis of the amplitude calculated by the amplitude calculation unit, and calculates upper slice level data by adding the offset value to the reference slice level data and lower slice level data by subtracting the offset value from the reference slice level data. Therefore, slice level data according to the signal shape can be obtained.

According to a 13th aspect of the present invention, in the data slicer of the 12th aspect, when calculating the average value from the maximum and minimum values, the slice level data calculation unit carries out an averaging process for the calculated average value and the reference slice level data that has been calculated in a previous cycle, and updates the reference slice level data on the basis of the obtained average value. Therefore, even when the reference waveform is changed, slice level data that is appropriate to the signal shape can be obtained.

According to a 14th aspect of the present invention, in the data slicer of the 12th or 13th aspect, when the predetermine cycle and amplitude are detected, the slice level data calculation unit carries out an averaging process for the predetermined amplitude and an amplitude of the previous cycle, and decides the offset value on the basis of the obtained average amplitude. Therefore, even when the reference waveform is changed, slice level data that is appropriate to the signal shape can be obtained.

According to a 15th aspect of the present invention, in the data slicer of the 9th aspect, the input signal is a signal of character broadcast that is transmitted being superimposed upon a vertical blanking interval of a video signal. Therefore, the signal of character broadcast is binarized and then data included in the signal are extracted, whereby the received character broadcast signal can be displayed.

According to a 16th aspect of the present invention, there is provided a data slicing method for binarizing an input signal of a predetermined cycle using slice level data that are calculated on the basis of the input signal, and extracting data included in the input signal, comprising: an A/D conversion step of converting the input signal that is transmitted in serial, into a digital signal; a reference cycle detection step of determining whether a cycle of the digital signal is the predetermined cycle or not; a maximum/minimum retrieval step of retrieving maximum and minimum values of the digital signal; a slice level data calculation step of calculating plural pieces of slice level data on the basis of an average value and an amplitude of the digital signal, which are calculated from the maximum and minimum values at a time when the predetermined cycle is detected; a binarization step of converting the digital signal into plural binarized signals using the plural pieces of slice level data; a data extraction step of extracting data in accordance with an extraction pulse for extracting data from the binarized signals, thereby generating plural pieces of serial data; a decoding step of decoding the plural pieces of serial data, thereby generating plural pieces of decoded data; and a decoded data selection step of determining the presence or absence of errors in the decoded data, and selectively outputting decoded data including no error. Therefore, the data signal can be binarized into a correct value using one of the plural pieces of slice level data, whereby the data are correctly extracted even when signal distortion occurs in the data signal due to group delay or reduction in electric field strength, thereby suppressing the occurrence rate of decoding errors.

According to a 17th aspect of the present invention, there is provide a data slicing method for binarizing an input signal of a predetermined cycle and amplitude using slice level data which are calculated on the basis of the input signal, and extracting data included in the input signal, comprising: an A/D conversion step of converting the input signal that is transmitted in serial, into a digital signal; a reference cycle detection step of determining whether a cycle of the digital signal is the predetermined cycle or not; a maximum/minimum retrieval step of retrieving maximum and minimum values of the digital signal; an amplitude evaluation step of determining whether an amplitude of the digital signal, which is calculated from the retrieved maximum and minimum values is the predetermined amplitude or not; a slice level data calculation step of calculating plural pieces of slice level data on the basis of an average value and an amplitude of the digital signal, which are calculated from the maximum and minimum values at a time when the predetermined cycle and amplitude are detected; a binarization step of converting the digital signal into plural binarized signals using the plural pieces of slice level data; a data extraction step of extracting data from the plural binarized signals in accordance with an extraction pulse for extracting data, thereby generating plural pieces of serial data; a decoding step of decoding the plural pieces of serial data, thereby generating plural pieces of decoded data; a decoded data selection step of detecting errors in the plural pieces of decoded data, and selectively outputting one of the decoded data when errors are detected from all of the decoded data, or decoded data including no error when there are decoded data in which no error is detected; and an amplitude evaluation control step of counting errors in the decoded data selected in the decoded data selection step, and controlling the evaluation in the amplitude evaluation step on the basis of the number of errors. Therefore, when a desired signal is detected on the basis of the amplitude of the digital signal and thereby noises of a predetermined cycle are detected as the desired signal, the slice level data can be obtained on the basis of only the desired signal, with excepting the amplitude or average value obtained from the noises. Further, as plural pieces of slice level data are calculated, the data signal can be binarized into a correct value using one of the plural pieces of slice level data, whereby even when signal distortion occurs in the data signal due to group delay or reduction in electric field strength, the data can be extracted correctly, and thus the occurrence rate of decoding errors can be further suppressed.

According to a 18th aspect of the present invention, in the data slicing method of the 16th or 17th aspect, in the slice level data calculation step, the average value is employed as reference slice level data, an offset value is decided on the basis of the amplitude, then upper slice level data is calculated by adding the offset value to the reference slice level data, and lower slice level data is calculated by subtracting the offset value from the reference slice level data. Therefore, slice level data according to the signal shape can be obtained.

According to a 19th aspect of the present invention, there is provided an amplitude evaluation value setting method comprising: a start value setting step of setting a start value at an amplitude evaluation value for determining whether an input signal including data which are transmitted in serial is a desired signal or not; a signal detection step of evaluating an amplitude of the input signal on the basis of the amplitude evaluation value in a predetermined period, thereby detecting the desired signal; a slice level data calculation step of, when detecting the desired signal, calculating slice level data for binarizing the input signal, on the basis of the detected desired signal; a binarization step of binarizing the input signal using the slice level data, to be converted into a binarized signal; a decoding step of decoding serial data which are extracted from the binarized signal, thereby generating decoded data; an error count step of counting errors in the decoded data, and storing the amplitude evaluation value and the number of errors; an amplitude evaluation value update step of binarizing and decoding the input signal and counting errors in the decoded data during a predetermined period, thereafter subjecting the amplitude evaluation value to an arithmetic process using a predetermined step value, so as to approach an end value, and updating the amplitude evaluation value; and an amplitude evaluation value selection step of selecting an amplitude evaluation value that minimizes the number of errors as an optimum amplitude evaluation value, on the basis of the numbers of errors at various amplitude evaluation values, which are obtained by changing the amplitude evaluation value in the predetermined step value from the start value to the end value. Therefore, the amplitude evaluation value is changed to a value that is appropriate to the shape of the digital signal, whereby a desired signal can be detected using the amplitude evaluation value that is appropriate to the signal shape, to calculate the slice level data, and accordingly the occurrence of decoding errors can be suppressed even when the distortion of the digital signal is changed.

DETAILED DESCRIPTION OF THE PREFERRED EMBODIMENTS

Hereinafter, embodiments of the present invention will be described with reference to the drawings. The embodiments shown here are only exemplary, and the present invention is not restricted to these embodiments.

Embodiment 1

A data slicer according to a first embodiment of the present invention will be described with reference to the drawings.

Figure 1:
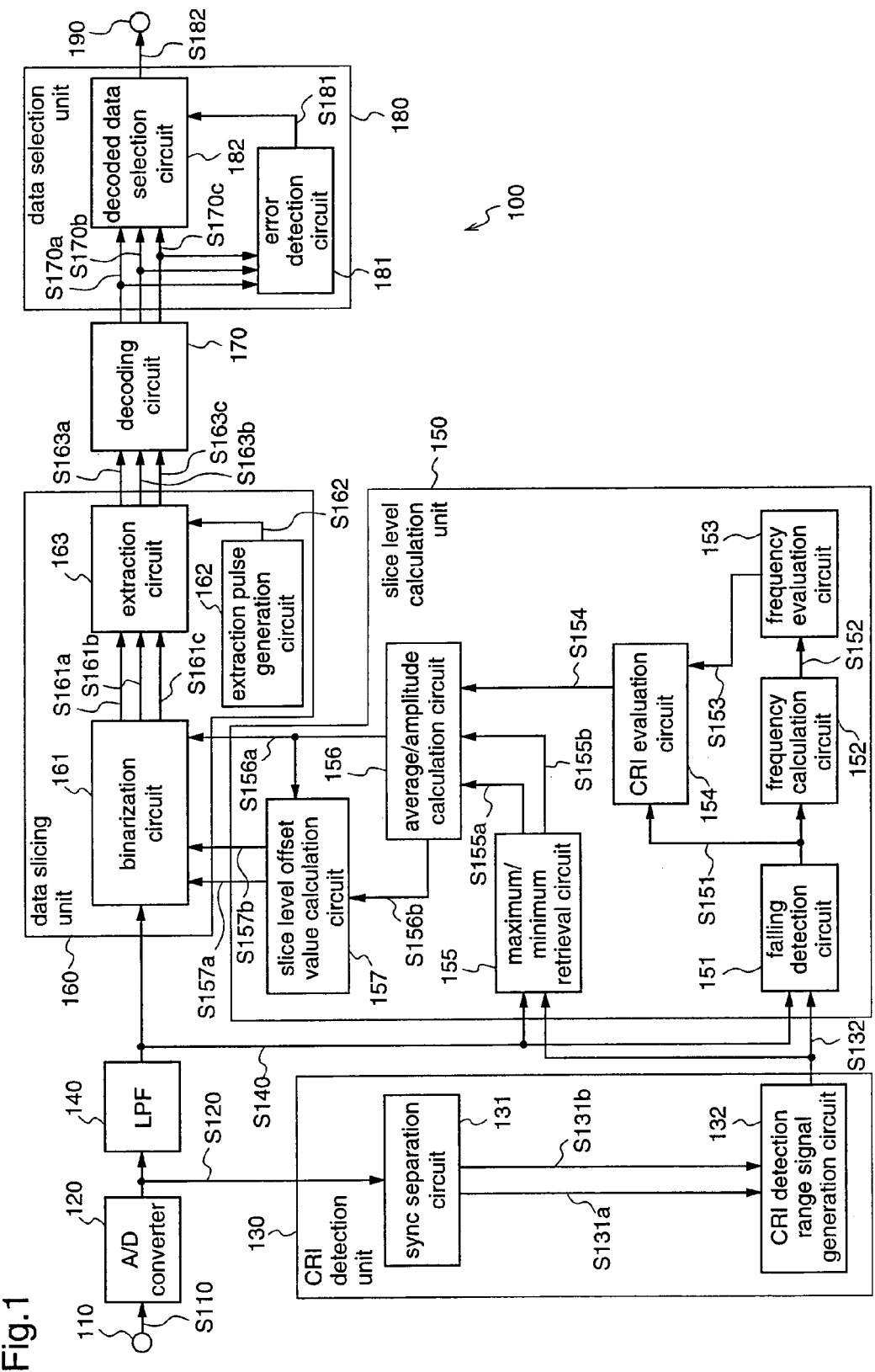
FIG. 1 is a block diagram illustrating a construction of a data slicer according to a first embodiment of the present invention.

FIG. 1 is a block diagram illustrating a construction of the data slicer according to the first embodiment.

As shown in FIG. 1, the data slicer 100 according to the first embodiment includes an A/D converter 120 that converts an analog video signal S110 inputted through a video signal input terminal 110, upon which character broadcast serial data are superimposed, into a digital video signal S120; a CRI detection unit 130 that outputs a CRI detection range signal S132 indicating a clock run-in (hereinafter, referred to as CRI) detection period, on the basis of the digital video signal S120; a low-pass filter (hereinafter, referred to as LPF) 140 that eliminates noises from the digital video signal S120, and outputs a digital video signal S140; a slice level calculation unit 150 that calculates a slice level and a slice level offset on the basis of the CRI signal C, and sets a reference slice level, and upper and lower slice levels which are obtained by providing the offset in the reference slice level; a data slicing unit 160 that binarizes the digital video signal S140 using the respective slice levels that are set by the slice level calculation unit 150; a decoding circuit 170 that converts respective binarized serial data into parallel data, and carries out a decoding process such as error correction depending on the type of character broadcast; and a data selection unit 180 that selects data including no error from the respective decoded data, and outputs the selected data through a video signal output terminal 190.

The CRI detection unit 130 includes a sync separation circuit 131 that separates a vertical sync signal S131a and a horizontal sync signal S131b from the digital video signal S120; and a CRI detection range signal generation circuit 132 that outputs a CRI detection range signal S132 indicating a predetermined line and position as a detection period of the CRI signal C, on the basis of the vertical sync signal S131a and the horizontal sync signal S131b.

The slice level calculation unit 150 includes a falling detection circuit 151 that outputs a falling detection pulse S151 when detecting a falling of the digital video signal S140 in the CRI detection period; a frequency calculation circuit 152 that calculates the frequency of the digital video signal S140 from the falling detection pulse S151, and outputs frequency data S152; a frequency evaluation circuit 153 that compares the frequency data S152 with previously-held frequency data of a CRI signal C for the character broadcast system, and outputs a frequency evaluation gate pulse S153 during a period in which the frequency data S152 that conforms to a predetermined character broadcast system are outputted; and a CRI evaluation circuit 154 that extracts a pulse corresponding to a falling of a predetermined character broadcast system from the falling detection pulse S151, and outputs a frequency evaluation pulse S154. The slice level calculation unit 150 further includes a maximum/minimum retrieval circuit 155 that retrieves the maximum and minimum amplitudes of the digital video signal S140 in the CRI detection period, and outputs maximum value retrieval data S155a and minimum value retrieval data S155b; an average/amplitude calculation circuit 156 that calculates an amplitude of the digital video signal S140 and an average value of the amplitude from the maximum value retrieval data S155a and the minimum value retrieval data S155b, using the frequency evaluation pulse S154 as a load pulse, and outputs the average value as reference slice level data S156a and the amplitude as amplitude detection data S156; and a slice level offset value calculation circuit 157 that calculates an offset value from the amplitude detection data S156b, and calculates upper slice level data S157a and lower slice level data S157b that are obtained by providing the offset in the reference slice level data S156a.

The data slicing unit 160 includes a binarization circuit 161 that performs threshold evaluation using the upper slice level data S157a, the reference slice level data S156a, and the lower slice level data S157b, respectively, to binarize the digital video signal S140, and outputs binarized data S161a to S161c to an extraction circuit 163; and an extraction circuit 163 that extracts character broadcast serial data from the respective binarized data S161a to S161c in timing of an extraction pulse S162 that is generated by an extraction pulse generation circuit 162, and outputs extracted serial data S163a to S163c.

The data selection unit 180 includes an error detection circuit 181 that determines whether decoded data S170a to S170c that are outputted from the decoding circuit 170 include decoding errors or not, and outputs a decoded data selection signal S181 that indicates decoded data including no decoding error; and a decoded data selection circuit 182 that selects the decoded data including no decoding error from the decoded data S170a to S170c, in accordance with the decoded data selection signal S181, and outputs final decoded data S182 to outside the apparatus, through a video signal output terminal 190.

Next, the operation of the data slicer 100 that is constructed as described above will be described with reference to the drawings.

Figure 2:
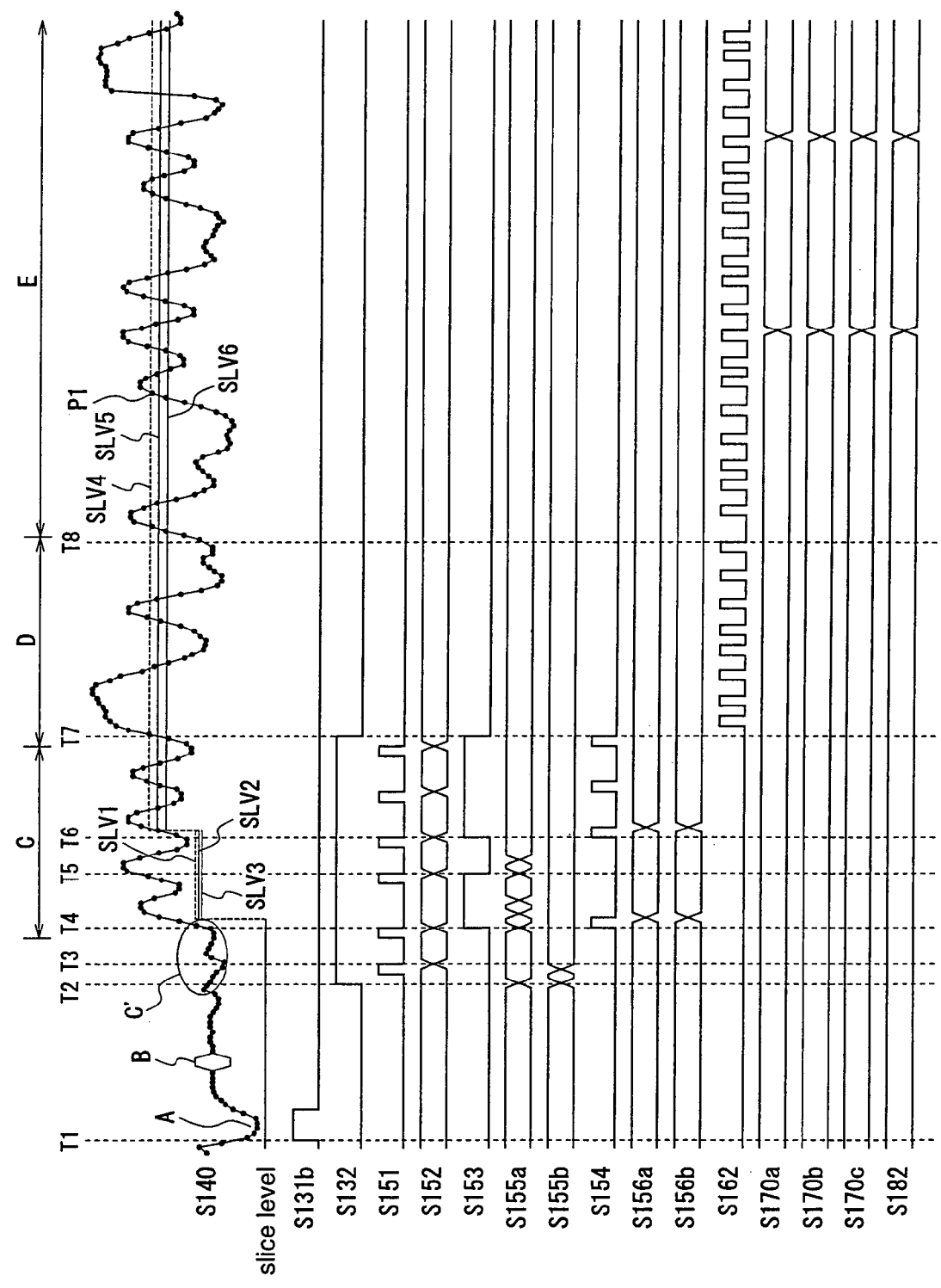
FIG. 2 is a timing chart showing an operation of the data slicer according to the first embodiment in a case where an attenuated signal is inputted thereto.

FIG. 2 is a timing chart showing an operation of the data slicer 100 in a case where an analog video signal S110 that is distorted due to group delay or reduction in electric field strength is inputted thereto. In FIG. 2, the same or corresponding elements as those in FIG. 1 are denoted by the same reference numerals. Reference character A denotes a horizontal sync signal, B denotes a color burst signal, C denotes a CRI signal, D denotes a framing code signal, E denotes a text data signal, and T1 to T8 denote times when the signals included in the digital video signal S140 vary.

When an analog video signal S110 upon which character broadcast serial data are superimposed is inputted through the video signal input terminal 110, the A/D converter 120 samples the analog video signal S110 using a sampling clock fs (MHz) to convert the same into a digital signal. For example, an operation clock of the data slicer 100 is used as the sampling clock fs. The digital video signal S120 that is obtained by the A/D converter 120 is outputted to the CRI detection unit 130 and the LPF 140. Then, the LPF 140 eliminates noises from the digital video signal S120, and outputs a digital video signal S140 to the slice level calculation unit 150 and the data slicing unit 160. FIG. 2 shows an example of the digital video signal S140 that is obtained by A/D-converting the distorted analog video signal S110, and eliminating noises from the converted signal. Reference character C' denotes noises that occur during a period in which the CRI detection range signal S132 is outputted, and cannot be eliminated by the LPF 140. The reason why the digital video signal S140 is distorted even when the LPF 140 performs the noise elimination is that the signal is affected by noises that cannot be eliminated even by the LPF 140. In this FIG. 2, black dots show the digital video signal S120 (S140) that is obtained by sampling the analog video signal S110 using the sampling clock fs.

Since the digital video signal S120 including a horizontal sync signal A and a vertical sync signal is inputted to the CRI detection unit 130 at time T1, the sync separation circuit 131 separates a vertical sync signal S131a and a horizontal sync signal S131b from the digital video signal S120.

Next, the CRI detection range signal generation circuit 132 obtains a start position and an end position of the CRI signal C on the basis of the vertical sync signal S131a and the horizontal sync signal S131b, and outputs a CRI detection range signal S132 to the falling detection circuit 131 and the maximum/minimum retrieval circuit 133 in a CRI detection period. Here, the CRI detection range signal generation circuit 132 may output the CRI detection range signal S132 continuously from a predetermined time (time T2) before the start of the CRI signal C to a predetermined time after the end of the CRI signal C, as shown in FIG. 2.

During a predetermined period in the period while the CRI detection range signal S132 is outputted, the digital video signal S140 including the CRI signal C is inputted to the slice level calculation unit 150, and then the slice level calculation unit 150 performs calculation of a slice level on the basis of the inputted CRI signal C. In order to calculate the slice level, the falling detection circuit 151 retrieves failings of the digital video signal S140, and the maximum/minimum retrieval circuit 155 retrieves the maximum and minimum values of the digital video signal S140, and outputs maximum value retrieval data S155a and minimum value retrieval data S155b.

At time T3, the falling detection circuit 151 erroneously detects a falling of the noises C' in the digital video signal S140 as a falling of the CRI signal C, and generates a falling detection pulse S151. Also at time T4, the falling detection circuit 151 erroneously detects a falling of the noises C' as a falling of the CRI signal C, and generates the falling detection pulse S151.

Then, the frequency calculation circuit 152 calculates the frequency of the digital video signal S140 on the basis of the falling detection pulses S151 that are detected at times T3 and T4, and outputs frequency data S152. On the basis of the frequency data S152, the frequency evaluation circuit 153 determines whether the failings that are detected by the falling detection circuit 151 correspond to a signal that is compliant with the predetermined character broadcast system or not. When the interval between failings of the noises C' is equal to the interval between failings of the CRI signal C, like in the digital video signal S140 shown in FIG. 2, the frequency evaluation circuit 153 erroneously determines that the frequency of the noises C' is a frequency that conforms to the predetermined character broadcast system, and outputs a frequency evaluation gate pulse S153 to the CRI evaluation circuit 154.

Then, on the basis of the frequency evaluation gate pulse S153, the CRI evaluation circuit 154 determines whether the falling detection pulse S151 is a pulse that is compliant with the character broadcast system or not. Since the interval between failings of the noises C' is equal to the interval between failings of the CRI signal C in this case, the CRI evaluation circuit 154 erroneously determines that the falling detection pulse S151 is a pulse conforming to the character broadcast, and outputs a frequency evaluation pulse S154 to the average/amplitude calculation circuit 156.

The average/amplitude calculation circuit 156 samples the maximum value retrieval data S155a and the minimum value retrieval data S155b, using the frequency evaluation pulse S154 as a load pulse, and calculates the average value and the amplitude of the digital video signal S140. Then, the average/amplitude calculation circuit 156 outputs the calculated average value as reference slice level data S156a to the slice level offset value calculation circuit 157 and the data slicing unit 160, and outputs the amplitudes as amplitude detection data S156b to the slice level offset value calculation circuit 157.

When slight phase shift or level offset occurs in the vicinity of a change point at which the digital video signal S140 changes from "0" to "1", the binarization circuit 161 may binarize the signal into an improper value. To avoid this, the data slicer 100 according to the first embodiment binarizes the digital video signal 140, also using slice level data which are obtained by providing an offset on the upper and lower sides of the reference slice level data S156a, respectively. The offset is an amplitude having a predetermined ratio to the amplitude of the CRI signal C. For example, the ratio is set at 20% of the amplitude. The slice level offset value calculation circuit 157 obtains an offset value on the basis of the predetermined ratio and the amplitude detection data S156b. Then, the slice level offset value calculation circuit 157 outputs upper slice level data S157a that is obtained by adding the obtained offset value to the reference slice level data S156a and lower slice level data S157b that is obtained by subtracting the offset value from the reference slice level data S156a. As shown in FIG. 2, a slice level SLV2 that is set on the basis of the reference slice level data S156a calculated using the noises C', a slice level SLV1 that is set on the basis of the upper slice level data S157a, and a slice level SLV3 that is set on the basis of the lower slice level data S157b are lower level than an optimum slice level that is set using the CRI signal C, and accordingly, these slice levels cannot be used for binarization of the digital video signal S140. Here, when the digital video signal S140 includes no distortion and no falling of the noises C' is detected at times T3 and T4, the above-mentioned processing at times T3 and T4 is not carried out, and the operation proceeds to processing at time T5, which will be now described.

At times T5 and T6, the CRI signal C is detected. The falling detection circuit 151 detects the first falling of the CRI signal C at time T5, then detects the second falling of the CRI signal C at time T6, and outputs falling detection pulses S151. While the maximum/minimum retrieval circuit 155 continuously performs the retrieval of the maximum and minimum values of the digital video signal S140 from time T2, but since the minimum value of the noises C' is smaller than the minimum value of the CRI signal in the digital video signal S140 as shown in FIG. 2, the minimum value retrieval data S155*b* is not updated by the CRI signal C, but the minimum value of the noises C' is continuously outputted.

The frequency that is calculated by the frequency calculation circuit 152 on the basis of the falling detection pulses S151 which are detected at times T5 and T6 is a frequency that is compliant with the character broadcast system. Therefore, the CRI evaluation circuit 154 outputs a generated frequency evaluation pulse S154 to the average/amplitude calculation circuit 156. The average/amplitude calculation circuit 156 samples the maximum value retrieval data S155*a* and the minimum value retrieval data S155*b*, using the frequency evaluation pulse S154 as a load pulse, and calculates the average value and the amplitude of the digital video signal S140. Then, the average/amplitude calculation circuit 156 outputs the calculated average value to the slice level offset value calculation circuit 157 and the data slicing unit 160 as reference slice level data S156*a*, and outputs the calculated amplitude to the slice level offset value calculation circuit 157 as amplitude detection data S156*b*. The slice level offset value calculation circuit 157 calculates an offset value from the amplitude detection data S156*b*, and outputs upper slice level data S157*a* that is obtained by adding the calculated offset value to the reference slice level data S156*a*, and lower slice level data S157*b* that is obtained by subtracting the offset value from the reference slice level data S156*a*. Here, the minimum value retrieval data S155*b* is the minimum value of the noises C', and thus a slice level SLV5 that is set on the basis of the calculated reference slice level data S156*a* is lower than an optimum slice level. However, since the offsets are provided, one of the slice level SLV4 that is set on the basis of the upper slice level data S157*a* and the slice level SLV6 that is set on the basis of the lower slice level data S157*b* is an appropriate slice level that can be employed to binarize the framing code signal D and the text data signal E after time T7.

When the digital video signal S140 including the framing code signal D is inputted to the data slicing unit 160 at time T7, the binarization circuit 161 determines whether the digital video signal S140 is higher or lower than the upper slice level data S157*a* to binarize the signal into "0" or "1", thereby generating binarized data S161*a*. Similarly, the binarization circuit 161 binarizes the digital video signal S140 on the basis of the reference slice level data S156*a*, thereby generating binarized data S161*b*, and binarizes the digital video signal S140 on the basis of the lower slice level data S157*b*, thereby generating binarized data S161*c*. Further, the extraction pulse generation circuit 162 generates an extraction pulse S162 that is employed as a sampling clock when character broadcast data are extracted from the respective binarized data S161*a* to S161*c*. Here, it is only required that the extraction pulse S162 have the same cycle as the transmission clock for the character broadcast signal. Then, the extraction circuit 163 extracts character broadcast serial data from the binarized data S161*a* in accordance with the extraction pulse S162, and outputs extracted serial data S163*a*. Similarly, the extraction circuit 163 extracts character broadcast serial data from the binarized data S161*b* in accordance with the extraction pulse S162, and outputs extracted serial data S163*b*, while extracting character broadcast serial data from the binarized data S161*c* in accordance with the extraction pulse S162 and outputting extracted serial data S163*c*. The decoding circuit 170 converts the extracted serial data S163*a* to S163*c* into parallel data, and detects the framing code.

When the digital video signal S140 including the text data signal E is inputted to the data slicing unit 160 at time T8, the binarization circuit 161 binarizes the digital video signal S140 like in the case including the framing code signal D, using the upper slice level data S157*a*, the reference slice level data S156*a*, and the lower slice level data S157*b*, thereby generating binarized data S161*a* to S161*c*. For example, when a point P1 in the digital video signal S140 is binarized using the upper slice level data S157*a*, "0" is obtained as the binarized data S161*a*. On the other hand, when this point Pi is binarized using the reference slice level data S156*a* and the lower slice level data S156*b*, "1" is obtained as the binarized data S161*b* and S161*c*, respectively. In a case where data of the point P1 is "0", correct data cannot be obtained when this data is binarized only using the reference slice level data S156*a*. Even in such cases that the data is binarized into an improper value when the reference slice level data S156*a* is employed, a correct value can be also obtained by using the upper slice level data S157*a* and the lower slice level data S157*b*. Then, the extraction circuit 163 extracts character broadcast serial data from the binarized data S161*a* to S161*c* in accordance with the extraction pulse S162, and outputs extracted serial data S163*a* to S163*b* to the decoding circuit 170.

The decoding circuit 170 converts the extracted serial data S163*a* to S163*c* into parallel data, then carries out a decoding process depending on the type of character broadcast indicated by the framing code, and outputs generated decoded data S170*a* to S170*c* to the data selection unit 180.

When the decoded data S170*a* to S170*c* are inputted to the data selection unit 180, the error detection circuit 181 detects the presence or absence of errors in the respective decoded data S170*a* to S170*c*. More specifically, the error detection circuit 181 counts "1" in the decoded data S170*a* for each data unit, and determines that the decoded data S170*a* includes no decoding error when the number of "1" is an odd number of bits. Similarly, the error detection circuit 181 determines whether the decoded data S170*b* and S170*c* include decoding errors or not, on the basis of the number of "1" in each data unit. Then, the error detection circuit 181 outputs a decoded data selection signal S181 that designates decoded data including no decoding error. Here, the error detection circuit 181 initially detects the presence or absence of decoding errors in the decoded data S170*b*, and outputs the decoded data selection signal S181 that designates the decoded data S170*b* when the data S170*b* includes no decoding error. When the decoded data S170*b* include a decoding error, the error detection circuit 181 determines whether the decoded data S170*a* and S170*c* includes a decoding error or not, and designates data including no decoding error. When all of the decoded data S170*a* to S170*c* include decoding errors, the error detection circuit 181 designates one of these data. The decoded data selection circuit 182 selects data including no decoding error from the decoded data S170*a* to S170*c* in accordance with the decoded data selection signal S181, and outputs final decoded data S182 to outside the data slicer 100 through the video signal output terminal 190.

The decoded data that is outputted from the video signal output terminal 190 is transferred to a display circuit (not shown), and displayed as characters.

As described above, the data slicer 100 according to the first embodiment includes the average/amplitude calculation circuit 156 that calculates the amplitude of the CRI signal C and the average value, and outputs the average value as the reference slice level data S156*a* and the amplitude as the amplitude level data S156*b*; the slice level offset value calculation circuit 157 that calculates an offset value on the basis of the amplitude level data S156*b*, and calculates upper slice level data S157a by adding the calculated offset value to the reference slice level data S156a, and lower slice level data S157b by subtracting the offset value from the reference slice level data S156a; the binarization circuit 161 that binarizes the digital video signal S140 using reference slice level data S156a, the upper slice level data S157a, and the lower slice level data S157b; the decoding circuit 170 that decodes extracted serial data S163a to S163c which are character broadcast serial data that are extracted from the binarized signal S161a to S161c; and the decoded data selection circuit 182 that selects data including no decoding error from the respective decoded data S170a to S170c, and outputs the selected data. Therefore, even when the digital video signal S140 is distorted due to group delay or reduction in electric field strength, and converted into an erroneous value when this video signal is binarized only with the reference slice level data S156a, this video signal can be binarized into a correct value using one of the slice level data, and the decoded data based on the correct binarized data is selectively outputted by the decoded data selection circuit 182, whereby the occurrence rate of decoding errors can be suppressed. Further, since the digital video signal can be binarized into a correct value using one of the plural slice level data, there is no need of a waveform equalization filter for correcting distortion of the waveform, thereby reducing the circuit scale of the data slicer.

Embodiment 2

A data slicer according to a second embodiment of the present invention will be described with reference to the drawings.

Figure 3:
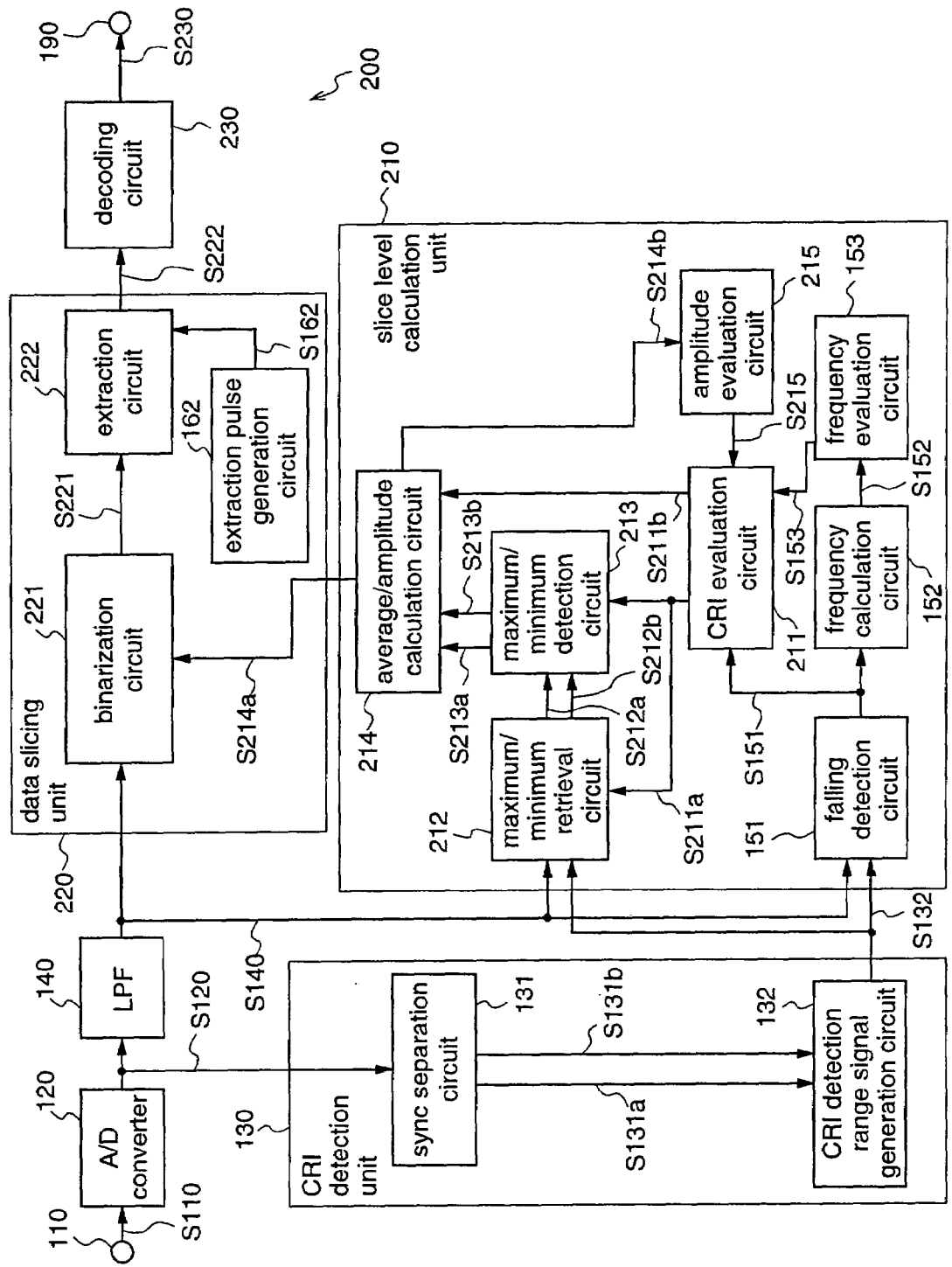
FIG. 3 is a block diagram illustrating a construction of a data slicer according to a second embodiment of the present invention.

FIG. 3 is a block diagram illustrating a construction of a data slicer 200 according to the second embodiment. In FIG. 3, the same or corresponding elements as shown in FIG. 1 are denoted by the same reference numerals.

As shown in FIG. 3, the data slicer 200 according to the second embodiment includes an A/D converter 120 that converts an analog video signal S110 inputted through a video signal input terminal 110, upon which character broadcast serial data are superimposed, into a digital video signal S120; a CRI detection unit 130 that generates a CRI detection range signal S132 indicating a CRI detection period on the basis of the digital video signal S120; a LPF 140 that eliminates noises of a predetermined band from the digital video signal S120, and outputs a digital video signal S140; a slice level calculation unit 210 that determines whether a detected signal is a CRI signal C or not, on the basis of the amplitude of the digital video signal S140, and sets a slice level using the maximum and minimum values of only the CRI signal C; a data slicing unit 220 that binarizes the digital video signal S140 using the slice level set by the slice level calculation unit 210; and a decoding circuit 230 that converts the binarized serial data into parallel data to perform decoding, and outputs decoded data S230 through a video signal output terminal 190.

The slice level calculation unit 210 includes a falling detection circuit 151 that outputs a falling detection pulse S151 when detecting a falling of the digital video signal S140 during a CRI detection period; a frequency calculation circuit 152 that calculates the frequency of the digital video signal S140 on the basis of the falling detection pulse S151, and outputs frequency data S152; a frequency evaluation circuit 153 that outputs a frequency evaluation gate pulse S153 during a period when a frequency conforming to a predetermined character broadcast system is obtained; and a CRI evaluation circuit 211 that outputs a frequency evaluation pulse S211a which is obtained by extracting a pulse corresponding to a falling of the predetermined character broadcast system from the falling detection pulse S151 in accordance with the frequency evaluation gate pulse S153, and an amplitude evaluation pulse S211b that is obtained by extracting a falling pulse of the character broadcast signal (a falling pulse of the CRI signal C) from the falling detection pulse S151 in accordance with an amplitude evaluation gate pulse S215 (which will be described later). The slice level calculation unit 210 further includes a maximum/minimum retrieval circuit 212 that retrieves the maximum and minimum values of the digital video signal S140 in the CRI detection period, and outputs maximum value retrieval data S212a and minimum value retrieval data S212b; a maximum/minimum detection circuit 213 that detects the maximum and minimum values of the digital video signal S140 from the maximum value retrieval data S212a and the minimum value retrieval data S212b, using the frequency evaluation pulse S211a as a load pulse, and outputs maximum value detection data S213a and minimum value detection data S213b; an average/amplitude calculation circuit 214 that calculates the amplitude of the digital video signal S140 and the average value of the amplitude from the maximum value detection data S213a and the minimum value detection data S213b, using an amplitude evaluation gate pulse S215 that is outputted from an amplitude evaluation circuit 215 (which will be described later) as a load pulse, and outputs the average value as slice level data S214a and the amplitude as amplitude detection data S214b; and an amplitude evaluation circuit 215 that determines whether the amplitude detection data S214b has an amplitude of the predetermined character broadcast signal or not on the basis of a preset CRI amplitude evaluation value, and outputs an amplitude evaluation gate pulse S215 during a period in which the data has the amplitude of the CRI signal C.

Here, the CRI evaluation circuit 211 extracts a pulse corresponding to a falling of the predetermined character broadcast system from the falling detection pulse S151, in accordance with the frequency evaluation gate pulse S153, and outputs a frequency evaluation pulse S211a to the maximum/minimum retrieval circuit 212 and the maximum/minimum detection circuit 213. This frequency evaluation pulse S211a is delayed by a delay circuit (not shown) by a time period that is required by the maximum/minimum detection circuit 213 to detect the maximum value retrieval data S212a and the minimum value retrieval data S212b, and then inputted to the maximum/minimum retrieval circuit 212. When the amplitude evaluation gate pulse S215 is inputted, the CRI evaluation circuit 211 extracts a pulse corresponding to a signal having an amplitude of the CRI signal C, from the frequency evaluation pulse S211a, in accordance with the amplitude evaluation gate pulse S215, and outputs the amplitude evaluation pulse S211b.

The maximum/minimum retrieval circuit 212 retrieves the maximum and minimum values of the digital video signal S140, and outputs the maximum value retrieval data S212a and the minimum value retrieval data S212b. Then, when the frequency evaluation pulse S211a is inputted, the maximum/minimum retrieval circuit 212 once resets the maximum value retrieval data S212a and the minimum value retrieval data S212b, then retrieves the maximum and minimum values in a new period, and outputs maximum value retrieval data S212a and minimum value retrieval data S212b. In this way, the maximum/minimum retrieval circuit 212 retrieves the maximum and minimum values in each period, on the basis of the frequency evaluation pulse S211a.

The average/amplitude calculation circuit 214 calculates the amplitude of the digital video signal S140 and the average value of the amplitude on the basis of the maximum value detection data S213a and the minimum value detection data S213b, and outputs the amplitude to the amplitude evaluation circuit 215 as amplitude detection data S214b. Only when the amplitude detection pulse S211b is inputted, the average/amplitude calculation circuit 214 outputs the calculated average value to the binarization unit 220 as the slice level data S214a. Further, when a new average value is calculated from new maximum value detection data S213a and minimum value detection data S213b in accordance with the next frequency evaluation pulse S211a, the average/amplitude calculation circuit 214 calculates the average between the new average value and the slice level data S214a, and updates the slice level data S214a on the basis of the calculated value.

In the amplitude evaluation circuit 215, a CRI amplitude evaluation value is previously set to be used as a judgement criterion at a time when it is judged whether the amplitude detection data S214b has the amplitude of the CRI signal C or not. The amplitude evaluation circuit 215 determines whether the amplitude detection data S214b has the amplitude of the CRI signal C or not, using the CRI amplitude evaluation value, and outputs an amplitude evaluation gate pulse S215 to the CRI evaluation circuit 211 during a period in which the data S214b has the amplitude of the CRI signal C.

The data slicing unit 220 includes a binarization circuit 221 that performs threshold evaluation using the slice level data S214a to binarize the digital video signal S140, and outputs binarized data S221 to an extraction circuit 222; and an extraction circuit 222 that extracts character broadcast serial data from the binarized data S221 in timing of an extraction pulse S162 that is generated by an extraction pulse generation circuit 162, and outputs extracted serial data S222.

Hereinafter, the operation of the data slicer 200 that is constructed as described above will be described with reference to the drawings.

Figure 4:
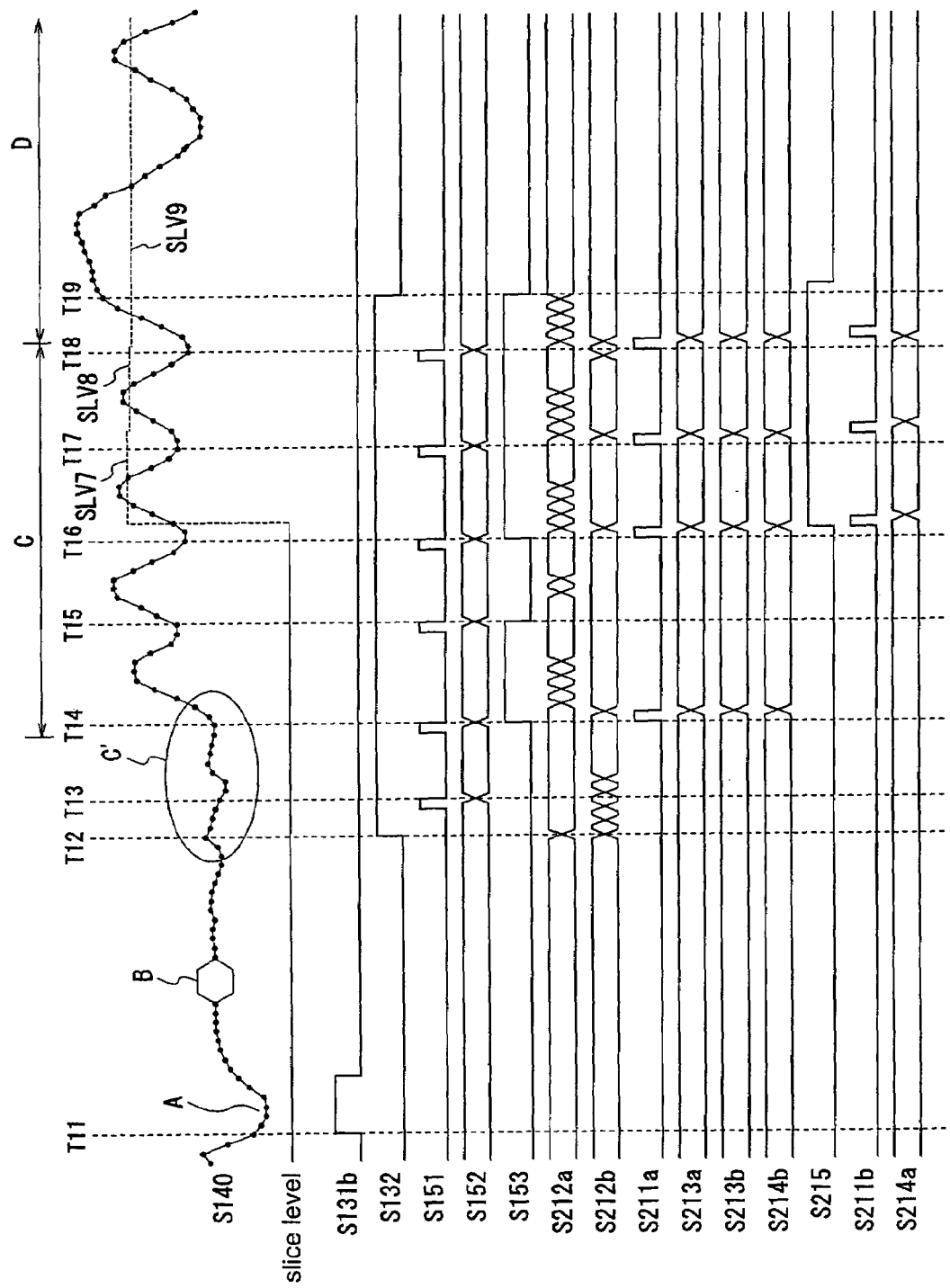
FIG. 4 is a timing chart showing an operation of the data slicer according to the second embodiment in a case where an attenuated signal is inputted thereto.

FIG. 4 is a timing chart showing an operation of the data slicer 200 in a case where an analog video signal S110 that is distorted due to group delay or reduction in electric field strength is inputted thereto. In FIG. 4, the same or corresponding elements as those in FIG. 3 are denoted by the same reference numerals. Reference characters T11 to T19 denote times when signals included in a digital video signal S140 vary.

When the analog video signal S110 upon which character broadcast serial data are superimposed is inputted through the video signal input terminal 110, the A/D converter 120 converts this signal into a digital signal, and outputs the digital video signal S120 to the CRI detection unit 130 and the LPF 140. Then, the LPF 140 outputs the digital video signal S140 that is obtained by eliminating noises from the digital video signal S120, to the slice level calculation unit 210 and the data slicing unit 220.

At time T11, the digital video signal S120 including a horizontal sync signal A and a vertical sync signal is inputted to the CRI detection unit 130, and then the sync separation circuit 131 separates a vertical sync signal S131a and a horizontal sync signal S131b from the digital video signal S120.

Then, the CRI detection range signal generation circuit 132 obtains a start position (time T12) and an end position of the CRI signal C on the basis of the vertical sync signal S131a and the horizontal sync signal S131b, and outputs a CRI detection range signal S132 during a CRI detection period.

While the CRI detection range signal S132 is inputted, the slice level calculation unit 210 performs slice level calculation on the basis of the CRI signal C, and accordingly the falling detection circuit 151 retrieves a falling of the digital video signal S140. The maximum/minimum retrieval circuit 212 retrieves the maximum and minimum values of the digital video signal S140, and outputs maximum value retrieval data S212a and minimum value retrieval data S212b to the maximum/minimum detection circuit 213.

At times T13 and T14, the falling detection circuit 151 erroneously detects a falling of noises C' in the digital video signal S140 as a falling of the CRI signal C, and generates a falling detection pulse S151. Then, the frequency calculation circuit 152 calculates the frequency of the digital video signal S140 on the basis of the falling detection pulses S151 that are detected at times T13 and T14, and outputs frequency data S152. On the basis of the frequency data S152, the frequency evaluation circuit 153 erroneously determines that the failings detected by the falling detection circuit 151 correspond to a signal of a predetermined character broadcast system, and outputs a frequency evaluation gate pulse S153 to the CRI evaluation circuit 211. On the basis of the frequency evaluation pulse S153, the CRI evaluation circuit 211 erroneously determines the falling detection pulse S151 is a pulse conforming to the character broadcast system, and outputs a frequency evaluation pulse S211a to the maximum/minimum retrieval circuit 211 and the maximum/minimum detection circuit 213.

The maximum/minimum detection circuit 213 samples the maximum value retrieval data S212a and the minimum value retrieval data S212b which are retrieved in a period from time T13 to time T14, using the frequency evaluation pulse S221a as a load pulse, thereby to detect the maximum and minimum values of the digital video signal S140, and outputs maximum value detection data S213a and minimum value detection data S213b. Further, when the frequency evaluation pulse S211a is inputted to the maximum/minimum retrieval circuit 212 after the maximum/minimum detection circuit 213 samples the maximum value retrieval data S212a and the minimum value retrieval data S212b, the maximum/minimum retrieval circuit 212 resets the maximum and minimum values retrieved in the period from T13 to T14, and retrieves maximum and minimum values of the digital video signal S140 after time T14. The average/amplitude calculation circuit 214 calculates the amplitude of the digital video signal S140 from the maximum value detection data S213a and the minimum value detection data S213b, and outputs the calculated value to the amplitude evaluation circuit 215 as amplitude detection data S214b. Since an amplitude detection pulse S211b is not yet generated at this point of time, slice level data S214a is not outputted.

Next, the amplitude evaluation circuit 215 determines whether the amplitude detection data S214b has the amplitude of the CRI signal C or not, using a preset CRI amplitude evaluation value. In this case, since the amplitude detection data S214b is detected on the basis of the noises C' and has a smaller value than the amplitude detection data that is detected on the basis of the CRI signal C, the amplitude detection data S214b does not meet requirements of the CRI amplitude evaluation value. Accordingly, the amplitude evaluation circuit 215 determines that the amplitude detection data S214b does not have the amplitude of the CRI signal, and does not generate the amplitude evaluation gate pulse S215.

At times T15 and T16, the CRI signal C is detected. The falling detection circuit 151 detects the first falling of the CRI signal C at time T15, then detects the second falling of the CRI signal C at time T16, and outputs falling detection pulses S151. Since the frequency that is calculated by the frequency calculation circuit 152 on the basis of the falling detection pulses S151 is a frequency that conforms to the character broadcast system, the frequency evaluation pulse S211a is inputted to the maximum/minimum retrieval circuit 212 and the maximum/minimum detection circuit 213.

The maximum/minimum detection circuit 213 samples the maximum value retrieval data S212a and the minimum value retrieval data S212b which are retrieved in a period from time T15 to time T16, using the frequency evaluation pulse S211a as a load pulse, thereby to detect the maximum and minimum values of the digital video signal S140, and outputs maximum value detection data S213a and minimum value detection data S213b. The maximum/minimum retrieval circuit 212 resets the maximum value retrieval data S212a and the minimum value retrieval data S212b which are retrieved in the period from time T15 to time T16, on the basis of the frequency evaluation pulse S211a, and retrieves maximum and minimum values of the digital video signal S140 after the time T16. The average/amplitude calculation circuit 214 calculates the amplitude of the digital video signal on the basis of the maximum value detection data S213a and the minimum value detection data S213b, and outputs the calculated value to the amplitude evaluation circuit 215 as amplitude detection data S214b.

Since this amplitude detection data S214b has the amplitude of the CRI signal C, the amplitude evaluation circuit 215 outputs the amplitude evaluation gate pulse S215 to the CRI evaluation circuit 211. Then, the CRI evaluation circuit 211 outputs an amplitude evaluation pulse S211b that is obtained by extracting a pulse of the CRI signal C from the frequency evaluation pulse S211a, in accordance with the amplitude evaluation gate pulse S215. When the amplitude evaluation pulse S211b is inputted, the average/amplitude calculation circuit 214 outputs the average value of the calculated amplitudes of the digital video signal S140 to the data slicing unit 220 as slice level data S214a. Here, the slice level data S214a is calculated not using the maximum value retrieval data and the minimum value retrieval data which are detected on the basis of the noises C' of the CRI signal, but using the maximum value retrieval data S212a and the minimum value retrieval data S212b of the CRI signal C. Accordingly, a slice level SLV7 that is set on the basis of the slice level data S214a is an appropriate level that can be employed to binarize the framing code signal D and the text data signal E after time T17.

At time T17, the falling detection circuit 151 detects the third falling of the CRI signal C, and outputs the falling detection pulse S151. As the frequency that is calculated by the frequency calculation circuit 152 on the basis of the falling detection pulses S151 that are outputted at times T16 and T17 is a frequency conforming to the character broadcast system, the frequency evaluation pulse S211a is inputted to the maximum/minimum retrieval circuit 212 and the maximum/minimum detection circuit 213.

The maximum/minimum detection circuit 213 outputs maximum value detection data S213a and minimum value detection data S213b using the frequency evaluation pulse S211a as a load pulse, to the average/amplitude calculation circuit 214. Then, the maximum/minimum retrieval circuit 212 resets the maximum value retrieval data S212a and the minimum value retrieval data S212b on the basis of the frequency evaluation pulse S211a, and retrieves maximum and minimum values after time T17. The average/amplitude calculation circuit 214 calculates the amplitude of the digital video signal S140 on the basis of the maximum value detection data S213a and the minimum value detection data S213b, and outputs the calculated value to the amplitude evaluation circuit 215 as amplitude detection data S214b.

Since the amplitude detection data S214 has the amplitude of the CRI signal C, the amplitude evaluation circuit 215 outputs the amplitude evaluation gate pulse S215 to the CRI evaluation circuit 211, and the CRI evaluation circuit 211 outputs the amplitude evaluation pulse S211b in accordance with the amplitude evaluation gate pulse S215.

When the amplitude evaluation pulse S211b is inputted, the average/amplitude calculation circuit 214 calculates the average value of the amplitudes of the digital video signal S140. The average/amplitude calculation circuit 214 further calculates the average between the average value calculated at time T17 and the slice level data calculated at time T16, and updates the slice level data S214a on the basis of the calculated value. Here, FIG. 4 shows a case where the maximum and minimum values of the digital video signal S140 in the period from time T16 to T17 are smaller than the maximum and minimum values in the period from time T15 to time T16, and a slice level SLV8 that is set on the basis of the slice level data S214a calculated at time T17 is lower than the slice level SLV7.

At time T18, the falling detection circuit 151 detects the fourth falling of the CRI signal C, and outputs the falling detection pulse S151. The slice level calculation unit 210 carries out the same processing as performed at time T17, on the basis of the falling detection pulse S151, and the maximum value detection data S212a and the minimum value detection data S212b which are retrieved by the maximum/minimum retrieval circuit 212, and updates the slice level data S214a.

When the CRI detection range signal S132 ends at time T19, the slice level calculation unit 210 finishes the slice level calculation process. Accordingly, the slice level data S214a at time T19 becomes fixed data which will not be changed after time T19. Here, when the maximum and minimum values of the digital video signal S140 in the period from time T17 to time T18 is lower than the maximum and minimum values in the period from time T16 to time T17 as shown in FIG. 4, a slice level SLV9 that is set on the basis of the slice level data S214a calculated at time T18 is lower than the slice level SLV8.

When the digital video signal S140 including a framing code signal D is inputted to the data slicing unit 220 at time T19, the binarization circuit 211 determines whether the digital video signal S140 is higher or lower than the slice level data S214a, thereby generating binarized data S221. Then, the extraction circuit 222 extracts character broadcast serial data from the binarized data S221 in accordance with an extraction pulse S162 that is generated by the extraction pulse generation circuit 162, and outputs the extracted serial data S222 to the decoding circuit 230. The decoding circuit 230 converts the extracted serial data S222 into parallel data, and detects the framing code.

When the digital video signal S140 including a text data signal E (not shown) is inputted to the data slicing unit 220 after the detection of the framing code, the binarization circuit 221 binarizes the digital video signal S140 using the slice level data S214a like in the case including the framing code signal D, to generate binarized data S221. Then, the extraction circuit 222 extracts character broadcast serial data from the binarized data S221 in accordance with an extraction pulse S162, and outputs extracted serial data S222 to the decoding circuit 230. The decoding circuit 230 converts the extracted serial data S222 into parallel data, then performs a decoding process according to the type of the character broadcast indicated by the framing code, and outputs decoded data S230 to outside the data slicer 200 through the video signal output terminal 190.

As described above, the data slicer 200 according to the second embodiment includes the amplitude evaluation circuit 215 that determines whether the amplitude detection data S214b calculated by the average/amplitude calculation circuit 214 has the amplitude of the CRI signal C or not, and thus the average/amplitude calculation circuit 214 outputs the calculated average value as slice level data S214a only when it is determined that the amplitude detection data S214b has the amplitude of the CRI signal C. Therefore, even when noises that occur due to signal distortion resulting from group delay or reduction in electric field strength in the transmission system are erroneously detected as the CRI signal C, it is possible to eliminate the average value that is calculated on the basis of the noises, and calculate slice level data S214a on the basis of the average value of only the CRI signal C.

Further, even when the noises are erroneously detected as the CRI signal, slice level data is not calculated on the basis of the detected noises. Therefore, also in the case of a character broadcast signal in which the CRI signal is not superimposed over a line in a vertical blanking interval that is defined in the standard, like in a teletext system adopted in Europe, the calculation of slice level data on the basis of noises can be suppressed.

Embodiment 3

A data slicer and an amplitude evaluation value setting method according to a third embodiment of the present invention will be described with reference to the drawings.

Figure 5:
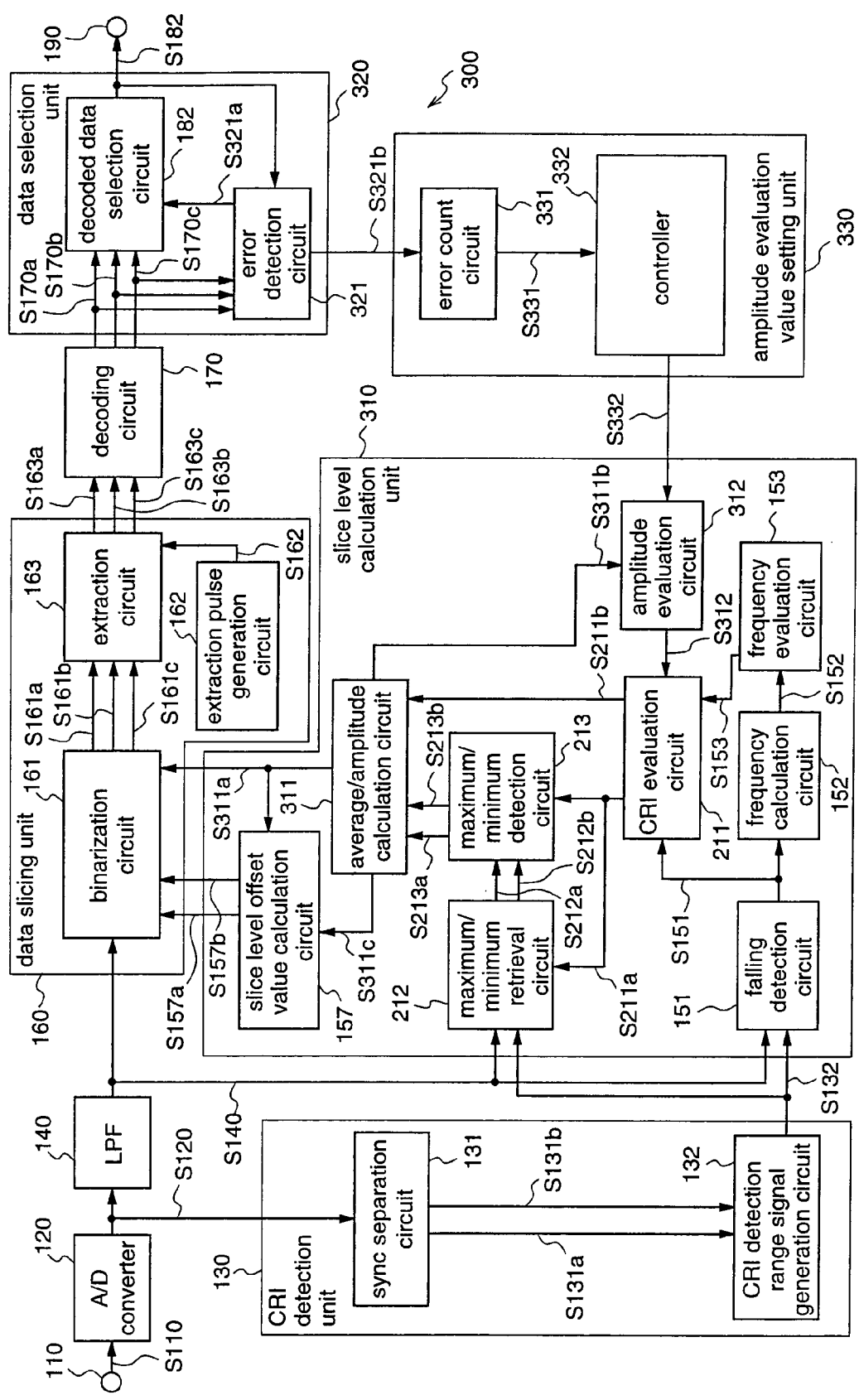
FIG. 5 is a block diagram illustrating a construction of a data slicer according to a third embodiment of the present invention.

FIG. 5 is a block diagram illustrating a construction of a data slicer 300 according to the third embodiment. In FIG. 5, the same or corresponding elements as those in FIG. 3 are denoted by the same reference numerals.

As shown in FIG. 5, the data slicer 300 according to the third embodiment includes an A/D converter 120 that converts an analog video signal S110 inputted through a video signal input terminal 110, upon which character broadcast serial data are superimposed, into a digital video signal S120; a CRI detection unit 130 that generates a CRI detection range signal S132 indicating a CRI detection period, on the basis of the digital video signal S120; a LPF 140 that eliminates noises from the digital video signal S120, and outputs a digital video signal S140; a slice level calculation unit 310 that determines whether the detected signal is a CRI signal C or not, on the basis of the amplitude of the digital video signal S140, calculates a slice level and an offset of the slice level using the maximum and minimum values of only the CRI signal C, and sets a reference slice level, and upper and lower slice levels which are obtained by providing the offset in the reference slice level; a data slicing unit 160 that binarizes the digital video signal S140 using the respective slice levels which are set by the slice level calculation unit 310; a decoding unit 170 that converts the respective binarized serial data into parallel data, and performs a decoding process such as error correction according to the type of the character broadcast; a data selection unit 320 that selects data including no error from respective decoded data, and outputs the selected data through a video signal output terminal 190; and an amplitude evaluation value setting unit 330 that sets an amplitude evaluation value that is employed when the slice level calculation unit 310 determines the amplitude of the digital video signal S140, on the basis of the number of errors detected by the decoding circuit 170, and outputs an optimum amplitude evaluation value S332.

The slice level calculation unit 310 includes a falling detection circuit 151 that outputs a falling detection pulse S151 when detecting a falling of the digital video signal S140 during a CRI detection period; a frequency calculation circuit 152 that calculates the frequency of the digital video signal S140 on the basis of the falling detection pulse S151, and outputs frequency data S152; a frequency evaluation circuit 153 that outputs a frequency evaluation gate pulse S153 during a period in which a frequency that is compliant with a predetermined character broadcast system is obtained; and a CRI evaluation circuit 211 that outputs a frequency evaluation pulse S211a that is obtained by extracting a pulse corresponding to a falling of a predetermined character broadcast, from the falling detection pulse S151, and an amplitude evaluation pulse S211b that is obtained by extracting a pulse of character broadcast (CRI signal C) in accordance with an amplitude evaluation gate pulse S312 (which will be later described). The slice level calculation unit 310 further includes a maximum/minimum retrieval circuit 212 that retrieves the maximum and minimum values of the digital video signal S140 in the CRI detection period, and outputs maximum value retrieval data S212a and minimum value retrieval data S212b; a maximum/minimum detection circuit 213 that detects the maximum and minimum values of the digital video signal S140 from the maximum value retrieval data S212a and the minimum value retrieval data S212b, using the frequency evaluation pulse S211a as a load pulse, and outputs maximum value detection data S213a and minimum value detection data S213b; an average/amplitude calculation circuit 311 that calculates the amplitude of the digital video signal S140 and the average amplitude from the maximum value detection data S21a and the minimum value detection data S213b, and outputs the average value as reference slice level data S311a, the amplitude as amplitude detection data S311b, and the amplitude of the CRI signal C as amplitude level data S311c; a slice level offset value calculation circuit 157 that calculates an offset value from the amplitude level data S311c, and calculates upper slice level data S157a and lower slice level data S157b that are obtained by providing the offset in the reference slice level data S311a; and an amplitude evaluation circuit 312 that determines whether the amplitude detection data S311b has the amplitude of a signal of a predetermined character broadcast or not, on the basis a preset CRI amplitude evaluation value or an optimum amplitude evaluation value S332 that is inputted from the amplitude evaluation setting unit 330, and outputs an amplitude evaluation gate pulse S312 during a period in which the data S311b has the amplitude of the CRI signal C.

Here, the average/amplitude calculation unit 311 calculates the amplitude of the digital video signal S140 and the average amplitude on the basis of the maximum value detection data S213a and the minimum value detection data S213b, and outputs the amplitude to the amplitude evaluation circuit 312 as amplitude detection data S311b. Only when the amplitude evaluation pulse S211b is inputted, the average/amplitude calculation unit 311 outputs the calculated average to the slice level offset value calculation circuit 157 and the binarization unit 220 as reference slice level data S311a. Further, the average/amplitude calculation unit 311 outputs the calculated amplitude to the slice level offset value calculation circuit 157 as amplitude level data S311c when the amplitude evaluation pulse S211b is inputted thereto.

When the average/amplitude calculation circuit 311 calculates a new amplitude and a new average value on the basis of new maximum value detection data S213a and minimum value detection data S213, in accordance with the next frequency evaluation pulse S211a, the calculation circuit 311 further calculates the average between the new average value and the reference slice level data S311a, and updates the reference slice level data S311a on the basis of the calculated value. Similarly, the calculation circuit 311 calculates the average between the new amplitude and the amplitude level data S311c, and updates the amplitude level data S311c on the basis of the calculated value.

In the amplitude evaluation circuit 312, a CRI amplitude evaluation value is previously set to be used as a judgement criterion when it is judged whether the amplitude detection data S311b has the amplitude of the CRI signal C or not. The amplitude evaluation circuit 312 determines whether the amplitude detection data S311b has the amplitude of the CRI signal C or not, using the CRI amplitude evaluation value, and outputs an amplitude evaluation gate pulse S312 to the CRI evaluation circuit 211 during a period in which the data S311b has the amplitude of the CRI signal C. When the optimum amplitude evaluation value S332 is inputted from the amplitude evaluation value setting unit 330, the amplitude evaluation circuit 312 updates the CRI amplitude evaluation value on the basis of the optimum amplitude evaluation value S332, and evaluates the amplitude of the amplitude detection data S311b using the updated CRI amplitude evaluation value.

The data selection unit 320 includes an error detection circuit 321 that outputs an error detection signal S321b indicating whether final decoded data S182 includes a decoding error or not, as well as a decoded data selection signal S321a that indicates decoded data including no decoding error; and a decoded data selection circuit 182 that selects decoded data including no error from decoded data S170a to S170c in accordance with the decoded data selection signal S321a, and outputs the final decoded data S182 to outside the data slicer through the video signal output terminal 190.

The amplitude evaluation value setting unit 330 includes an error count circuit 331 that counts decoding errors which are detected in a predetermined period on the basis of the error detection signal S321b, and generates error count data S331; and a controller 332 that decides an optimum value for the CRI amplitude evaluation value on the basis of the error count data S331, and outputs an optimum amplitude evaluation value S332 to the amplitude evaluation circuit 312 in the slice level calculation unit 310.

Figure 6:
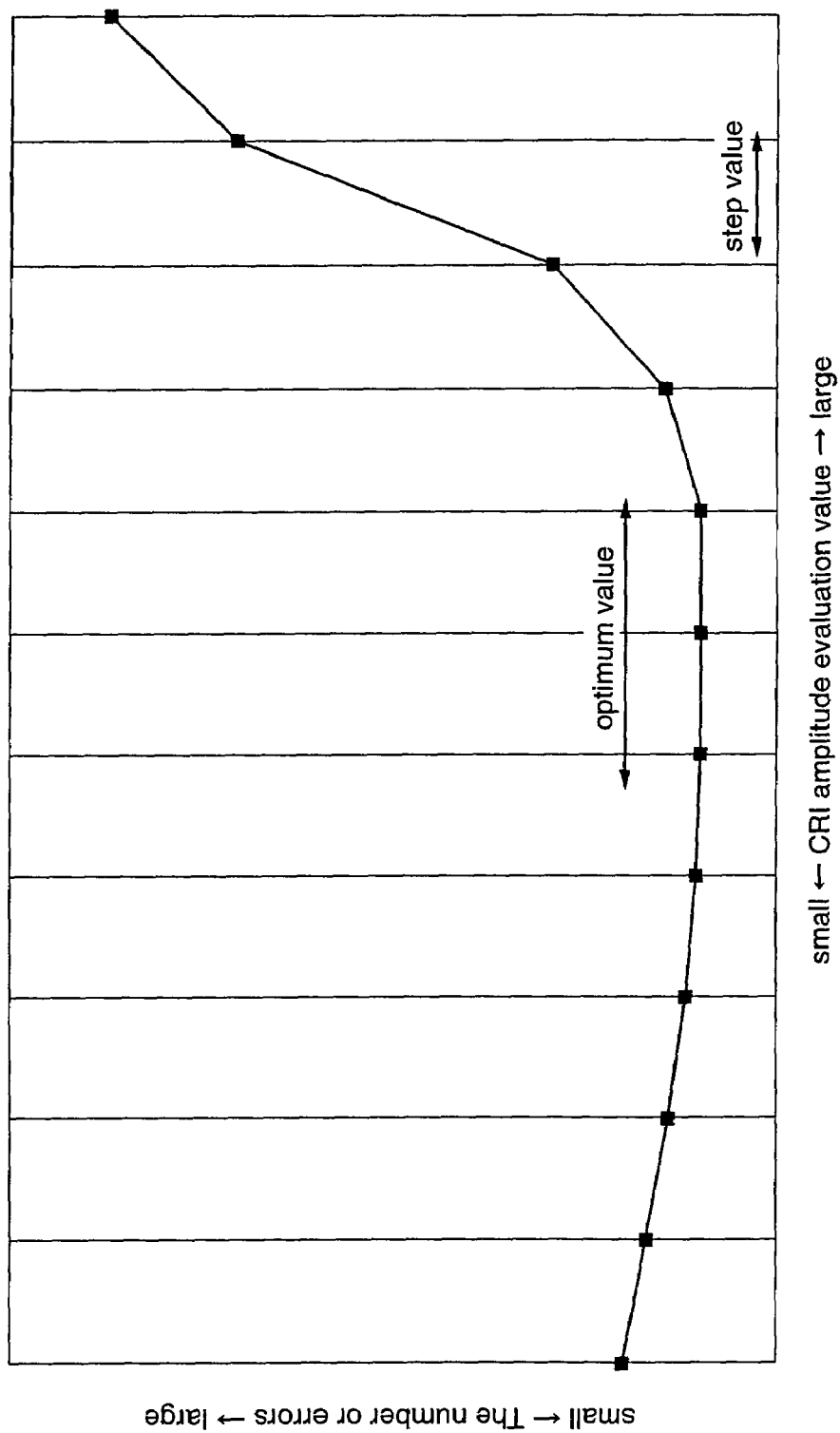
FIG. 6 is a diagram showing the relationship between the CRI amplitude evaluation value and the number of errors, which are used for setting a CRI amplitude evaluation value.

Here, the controller 332 holds the relationship between the CRI amplitude evaluation value and the error count data in a case where the CRI amplitude evaluation value takes various values. FIG. 6 shows an example of the relationship between the CRI amplitude evaluation value and the error count data. A method for obtaining the relationship between the CRI amplitude evaluation value and the error count data will be described later. When the error count data S331 is inputted, the controller 332 detects an optimum CRI amplitude evaluation value in a case where the number of errors is equal to the error count data S331 on the basis of the relationship between the CRI amplitude evaluation value and the error count data. Then, the controller 332 outputs the detected optimum CRI amplitude evaluation value to the amplitude evaluation circuit 312 as the optimum amplitude evaluation value S332.

Next, an operation of the data slicer 300 that is constructed as described above will be explained with reference to the drawings.

Figure 7:
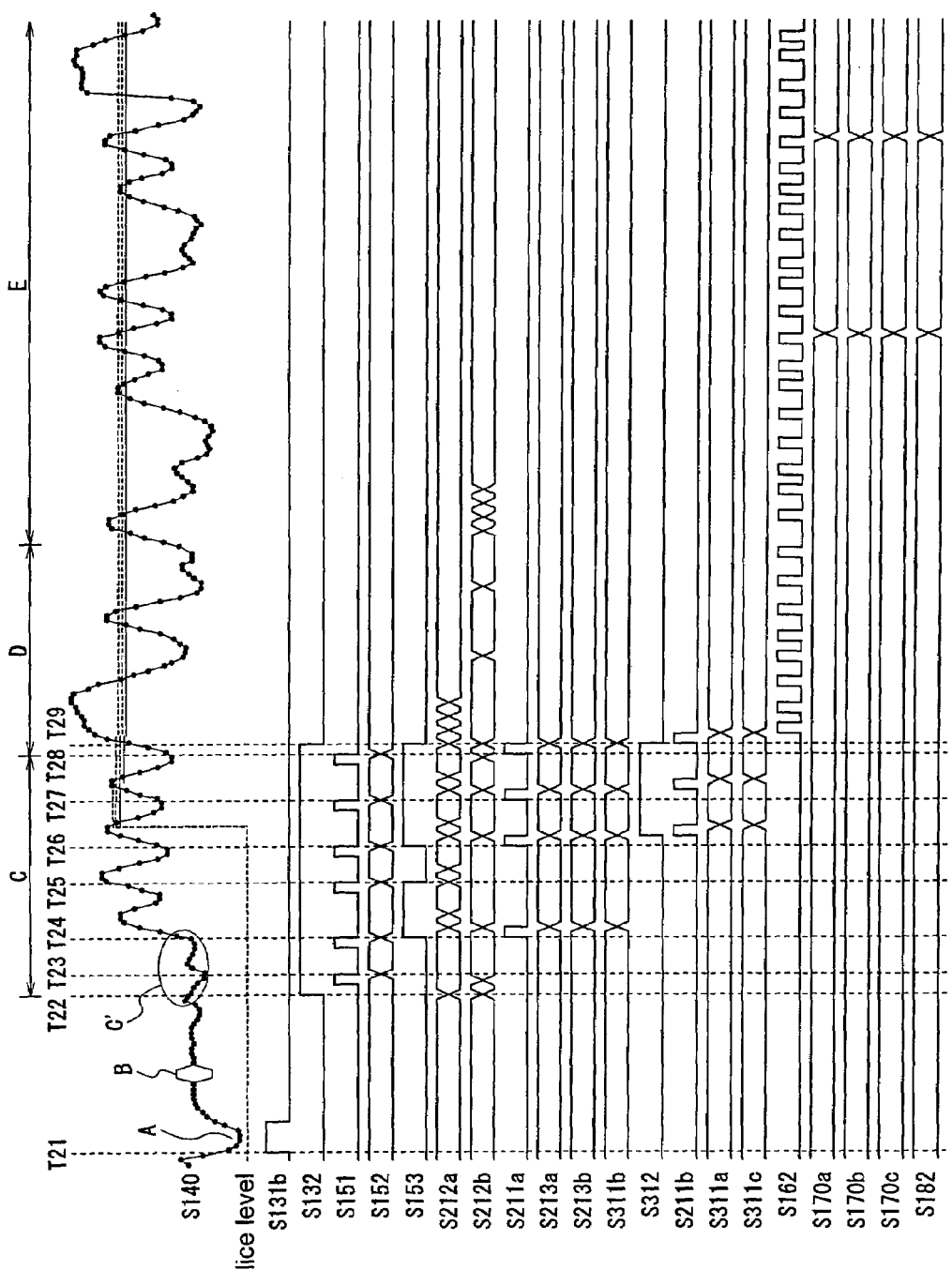
FIG. 7 is a timing chart showing an operation of the data slicer according to the third embodiment in a case where an attenuated signal is inputted thereto.

FIG. 7 is a timing chart showing an operation of the data slicer 300 in a case where an analog video signal S110 that is distorted due to group delay or reduction in electric field strength is inputted thereto. In FIG. 7, the same or corresponding elements as those shown in FIG. 5 are denoted by the same reference numerals. Further, reference characters T21 to T29 denote times when signals included in the digital video signal S140 vary.

When the analog video signal S110 upon which character broadcast serial data are superimposed is inputted through the video signal input terminal 110, the A/D converter 120 converts the analog video signal S110 into a digital signal, and outputs the digital video signal S120 to the CRI detection unit 130 and the LPF 140. Then, the LPF 140 eliminates noises from the digital video signal S120, and outputs a resultant digital video signal S140 to the slice level calculation unit 310 and the data slicing unit 160.

As the digital video signal S120 including a horizontal sync signal A and a vertical sync signal is inputted to the CRI detection unit 130 at time T21, the sync separation circuit S131 separates a vertical sync signal S131a and a horizontal sync signal S131b from the digital video signal S120.

Then, the CRI detection range signal generation circuit 132 obtains a start position (time T22) and an end position of the CRI signal C on the basis of the vertical sync signal S131a and the horizontal sync signal S131b, and outputs a CRI detection range signal S132 in the CRI detection period.

As the slice level calculation unit 310 performs a slice level calculation process on the basis of the CRI signal C while the CRI detection range signal S132 is inputted, the falling detection circuit 151 retrieves a falling of the digital video signal S140. The maximum/minimum retrieval circuit 212 retrieves the maximum and minimum values of the digital video signal S140, and outputs maximum value retrieval data S212a and minimum value retrieval data S212b to the maximum/minimum detection circuit 213.

At times T23 and T24, the falling detection circuit 151 erroneously detects a falling of noises C' in the digital video signal S140 as a falling of the CRI signal C, and generates a falling detection pulse S151. Then, the frequency calculation circuit 152 calculates the frequency of the digital video signal S140 on the basis of the falling detection pulses S151 that are detected at times T23 and T24, and outputs frequency data S152. On the basis of the frequency data S152, the frequency evaluation circuit 153 determines that the failings detected by the falling detection circuit 151 correspond to a signal that is compliant with a predetermined character broadcast system, and outputs a frequency evaluation gate pulse S153 to the CRI evaluation circuit 211. On the basis of the frequency evaluation gate pulse S153, the CRI evaluation circuit 211 determines that the falling detection pulse S151 is a pulse that is compliant with the character broadcast system, and outputs a frequency evaluation pulse S211a to the maximum/minimum retrieval circuit 212 and the maximum/minimum detection circuit 213.

The maximum/minimum detection circuit 213 samples the maximum value retrieval data S212a and the minimum value retrieval data S212b which are retrieved in a period from time T23 to time T24, using the frequency evaluation pulse S211a as a load pulse, thereby to detect the maximum and minimum values of the digital video signal S140, and outputs maximum value detection data S213a and minimum value detection data S213b. Further, the maximum/minimum retrieval circuit 212 resets the maximum value retrieval data S212a and the minimum value retrieval data S212b which are retrieved in the period from time T23 to time T24, on the basis of the frequency evaluation pulse S211a, and retrieves maximum and minimum values of the digital video signal S140 after time T24. The average/amplitude calculation circuit 311 calculates the amplitude of the digital video signal S140 on the basis of the maximum value detection data S213a and the minimum value detection data S213b, and outputs the calculated value to the amplitude evaluation circuit 312 as amplitude detection data S311b. Since an amplitude detection pulse S211b is not yet generated at this point of time, reference slice level data S311a or amplitude level data S311c are not outputted.

Then, the amplitude evaluation circuit 312 determines whether the amplitude detection data S311b has the amplitude of the CRI signal C or not, using a preset CRI amplitude evaluation value. In this case, as the amplitude detection data S311b is detected from the noises C' and accordingly has a smaller value than the amplitude detection data that is detected from the CRI signal C, the amplitude detection data S311b does not meet requirements of the CRI amplitude evaluation value. Thus, the amplitude evaluation circuit 312 determines that this amplitude detection data S311b does not have the amplitude of the CRI signal C, and does not generate the amplitude evaluation gate pulse S312.

At times T25 and T26, the CRI signal C is detected. The falling detection circuit 151 detects the first falling of the CRI signal C at time T25, then detects the second falling of the CRI signal C at time T26, and outputs the falling detection pulses S151. The frequency calculated by the frequency calculation circuit 152 on the basis of the falling detection pulses S151 is a frequency that conforms to the character broadcast system, so that a frequency evaluation pulse S211a is inputted to the maximum/minimum retrieval circuit 212 and the maximum/minimum detection circuit 213.

The maximum/minimum detection circuit 213 samples the maximum value retrieval data S212a and the minimum value retrieval data S212b which are retrieved in the period from time T25 to time T26, using the frequency evaluation pulse S211a as a load pulse, thereby to detect the maximum and minimum values of the digital video signal S140, and outputs maximum value detection data S213a and minimum value detection data S213b. Further, the maximum/minimum retrieval circuit 212 resets the maximum value retrieval data S212a and the minimum value retrieval data S212b which are retrieved in the period from time T25 to time T26, on the basis of the frequency evaluation pulse S211a, and retrieves maximum and minimum values of the digital video signal S140 after time T26. The average/amplitude calculation circuit 311 calculates the amplitude of the digital video signal from the maximum value detection data S213a and the minimum value detection data S213b, and outputs the calculated amplitude to the amplitude evaluation circuit 312 as amplitude detection data S311b.

The amplitude evaluation circuit 312 determines that the amplitude detection data S311b has the amplitude of the CRI signal C, and outputs an amplitude evaluation gate pulse S312 to the CRI evaluation circuit 211. Then, the CRI evaluation circuit 211 outputs amplitude evaluation pulses S211b that are obtained by extracting pulses of the CRI signal C from the frequency evaluation pulse S211a in accordance with the amplitude evaluation gate pulse S312, to the average/amplitude calculation circuit 311.

When the amplitude evaluation pulse S211b is inputted, the average/amplitude calculation circuit 311 outputs the average value of the calculated amplitudes of the digital video signal S140 to the slice level offset value calculation circuit 157 and the data slicing unit 160, as reference slice level data S311a, while outputting the amplitude to the slice level offset value calculation circuit 157 as amplitude level data S311c. The slice level offset value calculation circuit 157 calculates an offset value from the amplitude level data S311c, and outputs upper slice level data S157a that is obtained by adding the offset value to the reference slice level data S311a and lower slice level data S157b that is obtained by subtracting the offset value from the reference slice level data S311a.

At time T27, the falling detection circuit 151 detects the third falling of the CRI signal C, and outputs the falling detection pulse S151. As the frequency that is calculated by the frequency calculation circuit 152 on the basis of the falling detection pulses S151 that are outputted at times T26 and T27 is a frequency corresponding to the character broadcast system, the frequency evaluation pulse S211a is inputted to the maximum/minimum retrieval circuit 212 and the maximum/minimum detection circuit 213.

The maximum/minimum detection circuit 213 detects maximum value detection data S213a and minimum value detection value S213b using the frequency evaluation pulse S211a as a load pulse, and outputs the detected data S213a and S213b to the average/amplitude calculation circuit 311. The maximum/minimum retrieval circuit 212 resets the maximum value retrieval data S212a and the minimum value retrieval data S212b on the basis of the frequency evaluation pulse S211a, and retrieves maximum and minimum values after time T27. The average/amplitude calculation circuit 311 calculates the amplitude of the digital video signal S140 from the maximum value detection data S213a and the minimum value detection data S213b, and outputs the calculated amplitude to the amplitude evaluation circuit 312 as amplitude detection data S311b.

As the amplitude detection data S311b has the amplitude of the CRI signal C, the amplitude evaluation circuit 312 outputs an amplitude evaluation gate pulse S312 to the CRI evaluation circuit 211, and the CRI evaluation circuit 211 outputs the amplitude evaluation pulse S211b in accordance with the amplitude evaluation gate pulse S312.

When the amplitude evaluation pulse S211b is inputted, the average/amplitude calculation circuit 311 calculates the average amplitude of the digital video signal S140. The average/amplitude calculation circuit 311 further calculates the average value between the average value calculated at time T27 and the reference slice level data calculated at time T26, and updates the reference slice level data S311a on the basis of the calculated value. The average/amplitude calculation circuit 311 further calculates the average value between the amplitude of the digital video signal S140 at time T27 and the amplitude level data S311c calculated at time T26, and updates the amplitude level data S311c on the basis of the calculated value. Then, the slice level offset value calculation circuit 157 calculates upper slice level data S157a and lower slice level data S157b on the basis of an offset value that is calculated from the amplitude level data S311c.

At time T28, the falling detection circuit 151 detects the fourth falling of the CRI signal C, and outputs the falling detection pulse S151. On the basis of the falling detection pulse, and the maximum value detection data S212a and the minimum value detection data S212b which are retrieved by the maximum/minimum retrieval circuit 212, the slice level calculation unit 310 carries out the same processing as that performed at time T27 and outputs reference slice level data S311a, upper slice level data S157a, and lower slice level data S157b.

When the CRI detection range signal S132 ends at time T29, the slice level calculation unit 310 finishes the slice level calculation process. Thus, the reference slice level data S311a, the upper slice level data S157a, and the lower slice level data S157b at time T29 become fixed data which will never be changed after that time.

When the digital video signal S140 including the framing code signal D is inputted to the data slicing unit 160 at time T29, the binarization circuit 161 binarizes the digital video signal S140 using the upper slice level data S157a, the reference slice level data S311a, and the lower slice level data S157b, to generate binarized data S161a to S161c, respectively. Then, the extraction circuit 163 extracts character broadcast serial data from the binarized data S161a to S161c, in accordance with an extraction pulse S162 that is generated by the extraction pulse generation circuit 162, and outputs extracted serial data S163a to S163c to the decoding circuit 170. The decoding circuit 170 converts the extracted serial data S163a to S163c into parallel data, and detects the framing code.

When the digital video signal S140 including a text data signal E is inputted to the data slicing unit 160, the binarization circuit 161 binarizes the digital video signal S140 using the upper slice level data S157a, the reference slice level data S311a, and the lower slice level data S157b, like in the case including the framing code signal D, thereby to generate binarized data S161a to S161c, respectively. Then, the extraction circuit 163 extracts character broadcast serial data from the binarized data S161a to S161c in accordance with the extraction pulse S162, and outputs extracted serial data S163a to S163c to the decoding circuit 170. Then, the decoding circuit 170 converts the extracted serial data S163a to S163c into parallel data, then carries out a decoding process according to the type of the character broadcast indicated by the framing code, and outputs decoded data S170a to S170c to the data selection unit 320.

When the decoded data S170a to S170c are inputted to the data selection unit 320, the error detection circuit 321 detects decoding errors from the decoded data S170a to S170c. Then, the error detection circuit 321 outputs a decoded data selection signal S321a that indicates decoded data including no decoding error, among the decoded data S170a to S170c. When all of the decoded data S170a to S170c include decoding errors, the decoded data selection signal S321a indicating one of these decoded data is outputted. The decoded data selection circuit 182 selects decoded data including no decoding error among the decoded data S170a to S170c, in accordance with the decoded data selection signal S321a, and outputs the selected data as final decoded data S182. The error detection circuit 321 determines whether the final decoded data S182 has a decoding error or not, and outputs an error detection signal S321b to the amplitude evaluation value setting unit 330 when the final decoded data has a decoding error.

When the error detection signal S321b is inputted to the amplitude evaluation value setting unit 330, the error count circuit 331 counts decoding errors in a predetermined period, on the basis of the error detection signal S321b. When this period expires, the error count circuit 331 outputs error count data S331 indicating the count of decoding errors to the controller 332. The controller 332 detects an optimum CRI amplitude evaluation value in a case where the number of decoding errors is equal to the error count data S331, on the basis of the held relationship between the CRI amplitude evaluation value and the error count data, and outputs an optimum amplitude evaluation value S332 to the slice level calculation unit 310. Then, the amplitude evaluation circuit 312 updates the CRI amplitude evaluation value in accordance with the optimum amplitude evaluation value S332.

Figure 8:
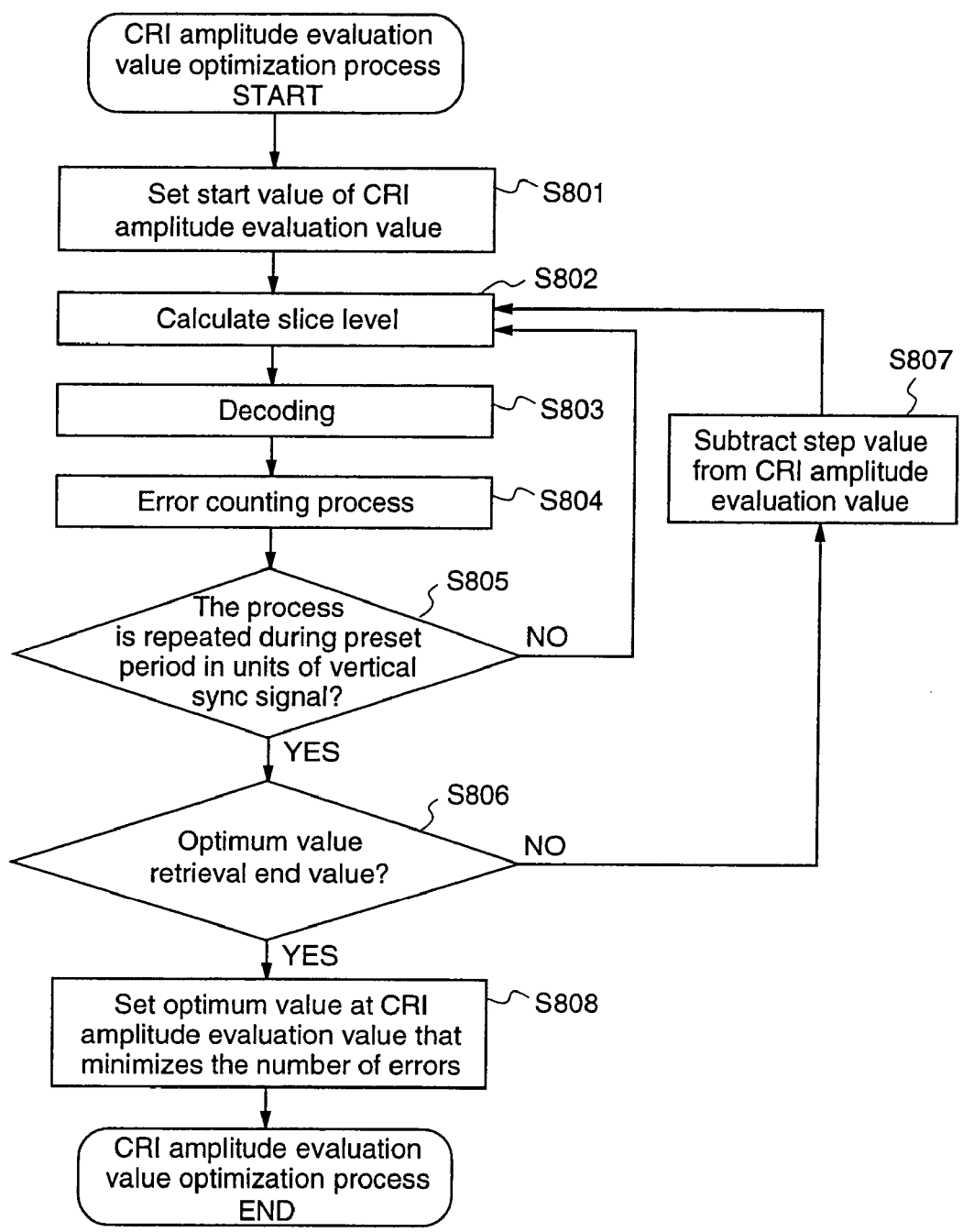
FIG. 8 is a flowchart for explaining a method by which a CRI amplitude evaluation value is set in the data slicer according to the third embodiment.

Next, the method for obtaining the relationship between the CRI amplitude evaluation value and the error count data in the data slicer 300, and the method for optimizing the CRI amplitude evaluation value held by the amplitude evaluation circuit 312 will be described with reference to a flowchart of FIG. 8.

This CRI amplitude value optimization process is implemented when a signal shape is unknown, for example at the power-on or at the switching of receiving channels, to set an optimum CRI amplitude evaluation value for the signal shape at that time.

Initially, the controller 332 sets a predetermined start value of the CRI amplitude value. More specifically, the controller 332 outputs the start value as an optimum amplitude evaluation value S332, and the amplitude evaluation circuit 312 sets the CRI amplitude evaluation value to the optimum amplitude evaluation value S332. In this case, a description will be given of a case where the retrieval is started from the largest value (step S801).

Then, the slice level calculation unit 310 determines the amplitude, using the CRI amplitude evaluation value that is set in step S801 as a reference value, then calculates a slice level using the CRI signal C that is evaluated to have an amplitude of the character broadcast, and outputs reference slice level data S311a, upper slice level data S157a, and lower slice level data S157b (step S802).

When the CRI detection period expires and a framing code signal D is inputted, the data slicing unit 160 binarizes the framing code signal D using the respective slice level data which are calculated in step S802, and the decoding circuit 170 obtains the framing code. Then, when a text data signal E is inputted, the data slicing unit 160 binarizes the text data signal E using the respective slice level data which are calculated in step S802, and the decoding circuit 170 carries out a decoding process for the respective binarized data. The data selection unit 320 selects decoded data including no decoding error, among the decoded data S170a to S170c, and outputs the selected data as final decoded data S182 (step S803).

When the final decoded data S182 includes a decoding error, the error detection circuit 321 outputs the error detection signal S321b, so that the error count circuit 331 counts errors on the basis of the error detection signal S321b, and outputs the error count data S331. The controller 332 holds the error count data S331 corresponding to the CRI amplitude evaluation value (optimum amplitude evaluation value S332) at that time (step S804).

Then, the controller 332 binarizes and decodes the text data signal E during a predetermined time period that is defined in units of vertical sync signal, to determine whether the error count data S331 is obtained or not, and the operation returns to step S802 unless the processing has been performed during the predetermined time period (step S805).

When it is determined in step S805 that the processing has been carried out during the predetermined time period, the controller 332 determines whether the present optimum amplitude evaluation value S332 is equal to a predetermined end value or not (step S806).

When the present optimum amplitude evaluation value S332 is not equal to the end value, the controller 332 subtracts a predetermined step value from the present optimum amplitude evaluation value S332. Then, the controller outputs this optimum amplitude evaluation value S332 to the amplitude evaluation circuit 312. The amplitude evaluation circuit 312 updates the CRI amplitude evaluation value on the basis of the optimum amplitude evaluation value S332. Then, the operation returns to step S802, and the slice level calculation is performed using the CRI signal C (step S807).

On the other hand, when the controller 332 has carried out the processing by subtracting the step value from the optimum amplitude evaluation value S332 up to the end value, the controller 332 selects a CRI amplitude evaluation value that minimizes the number of errors on the basis of the relationship between the obtained respective CRI amplitude evaluation value and the number of errors (see FIG. 6), and outputs the selected CRI amplitude evaluation value to the amplitude evaluation circuit 312 as the optimum amplitude evaluation value S332. The amplitude evaluation circuit 312 updates the CRI amplitude evaluation value on the basis of the optimum amplitude evaluation value S332, and finishes the CRI amplitude evaluation value optimization process (step S808).

As described above, the data slicer 300 according to the third embodiment includes the amplitude evaluation circuit 312 that determines whether the amplitude detection data S311b calculated by the average/amplitude calculation circuit 311 has the amplitude of the CRI signal C or not, on the basis of the held CRI amplitude evaluation values, and the average/amplitude calculation circuit 311 outputs the calculated average value as reference slice level data S311a and the calculated amplitude as amplitude level data S311c, respectively, only when it is determined that the amplitude detection data S311b has the amplitude of the CRI signal. Therefore, even when noises of a cycle that is quite similar to that of the CRI signal C are erroneously detected as the CRI signal C, the reference slice level data S311a can be calculated with eliminating the average value calculated on the basis of the noises.

The data slice according to the third embodiment further includes the slice level offset value calculation circuit 157 that calculates the upper slice level data S157a by adding the offset value calculated on the basis of the amplitude level data S311c to the reference slice level data S311a, and the lower slice level data S157b by subtracting the offset value from the reference slice level data S311a. Therefore, even in cases where the digital video signal S140 is distorted due to group delay or electric field strength in the transmission system, and binarized into an erroneous value when the binarization is performed using only the reference slice level data S311a, the digital video signal S140 can be binarized into a correct value using one of the slice level data, whereby the occurrence rate of decoding errors can be further suppressed.

The data slicer of the third embodiment further includes the error count circuit 331 that counts decoding errors included in the final decoded data S182, and the controller 332 that changes the CRI amplitude evaluation value on the basis of the number of decoding errors. Therefore, even when the distortion of the digital video signal S140 varies, slice level data that are suitable for the signal shape can be calculated by updating the CRI amplitude evaluation value adaptively to the signal shape, thereby further suppressing the occurrence rate of decoding errors.

In this third embodiment, when the error count data corresponding to each CRI amplitude evaluation value (optimum amplitude evaluation value S332) is obtained, the start value of the optimum amplitude evaluation value S332 is set at the maximum value, and then the step value is successively subtracted from the optimum amplitude evaluation value S332, thereby to obtain the error count data S331 corresponding to the optimum amplitude evaluation value. However, also when the start value of the optimum amplitude evaluation value S332 is set at the minimum value, and then a step value is successively added to the optimum amplitude evaluation value S332, thereby to obtain the error count data S331 corresponding to the optimum amplitude evaluation value, the same effect as that in the third embodiment can be obtained.

Embodiment 4

A data slice according to a fourth embodiment of the present invention will be described with reference to the drawings.

Figure 9:
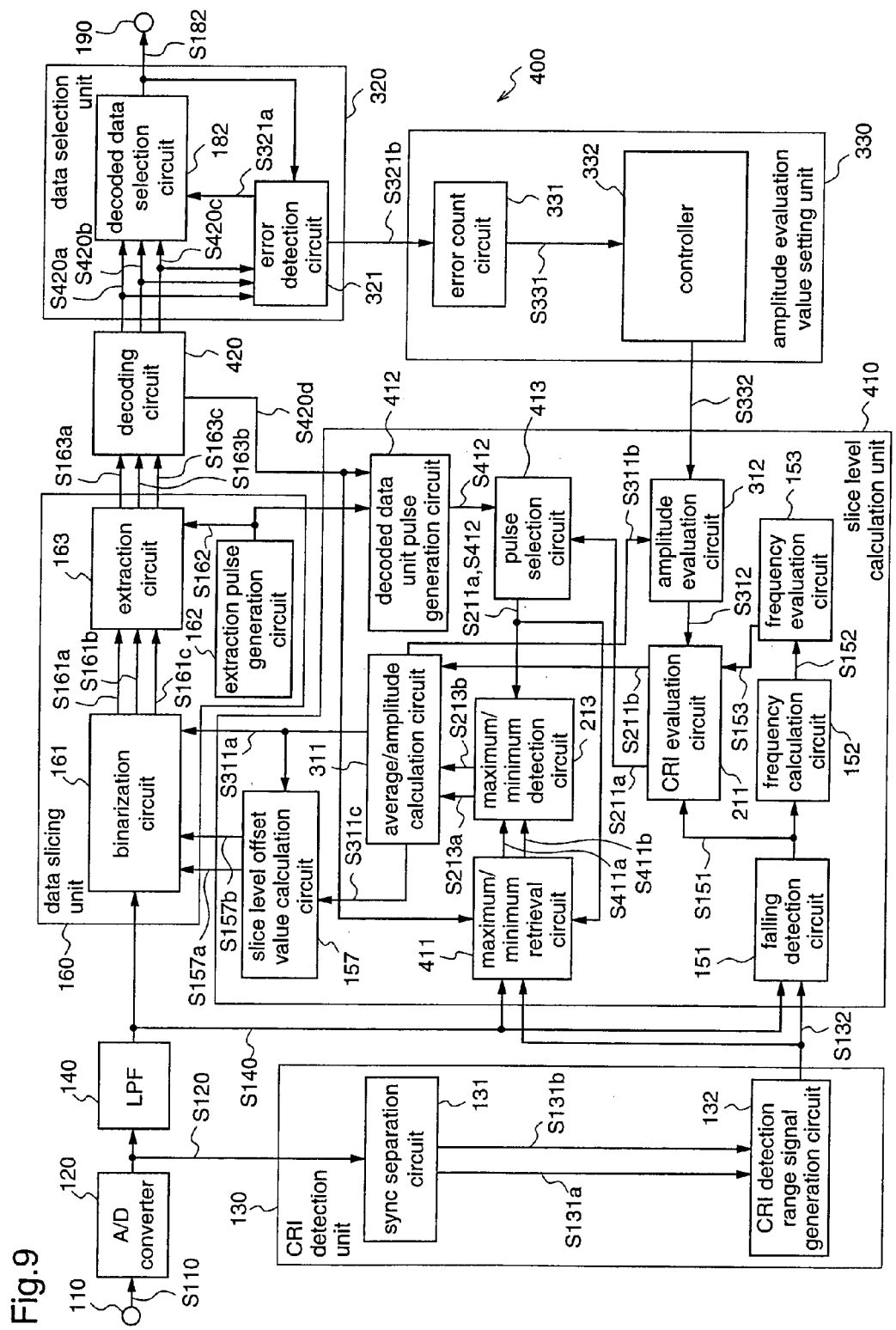
FIG. 9 is a block diagram illustrating a construction of a data slicer according to a fourth embodiment of the present invention.
Figure 10:
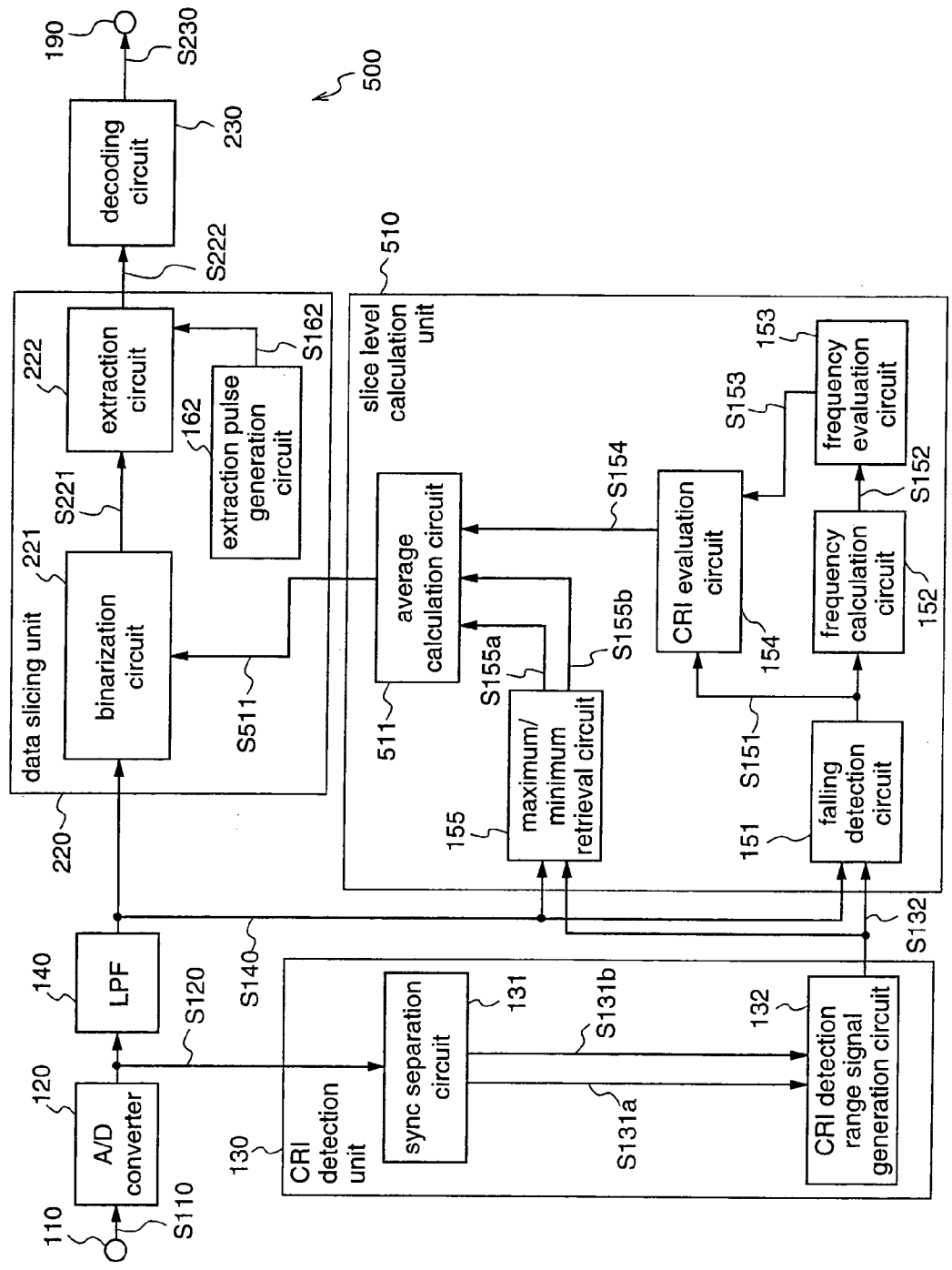
FIG. 10 is a block diagram illustrating a construction of a conventional data slicer.
Figure 11:
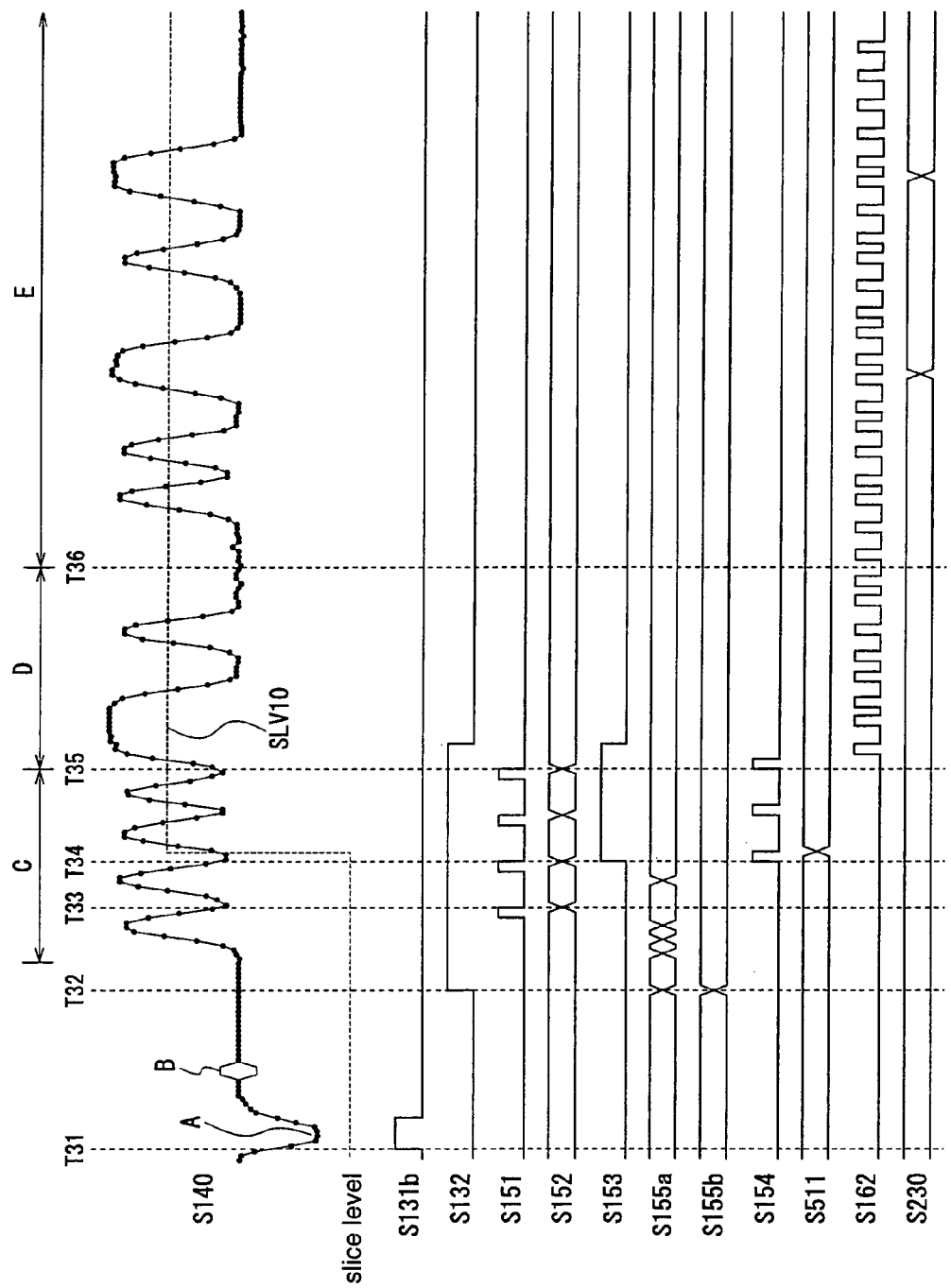
FIG. 11 is a timing chart showing an operation of the conventional data slicer in a case where a normal signal is inputted thereto.
Figure 12:
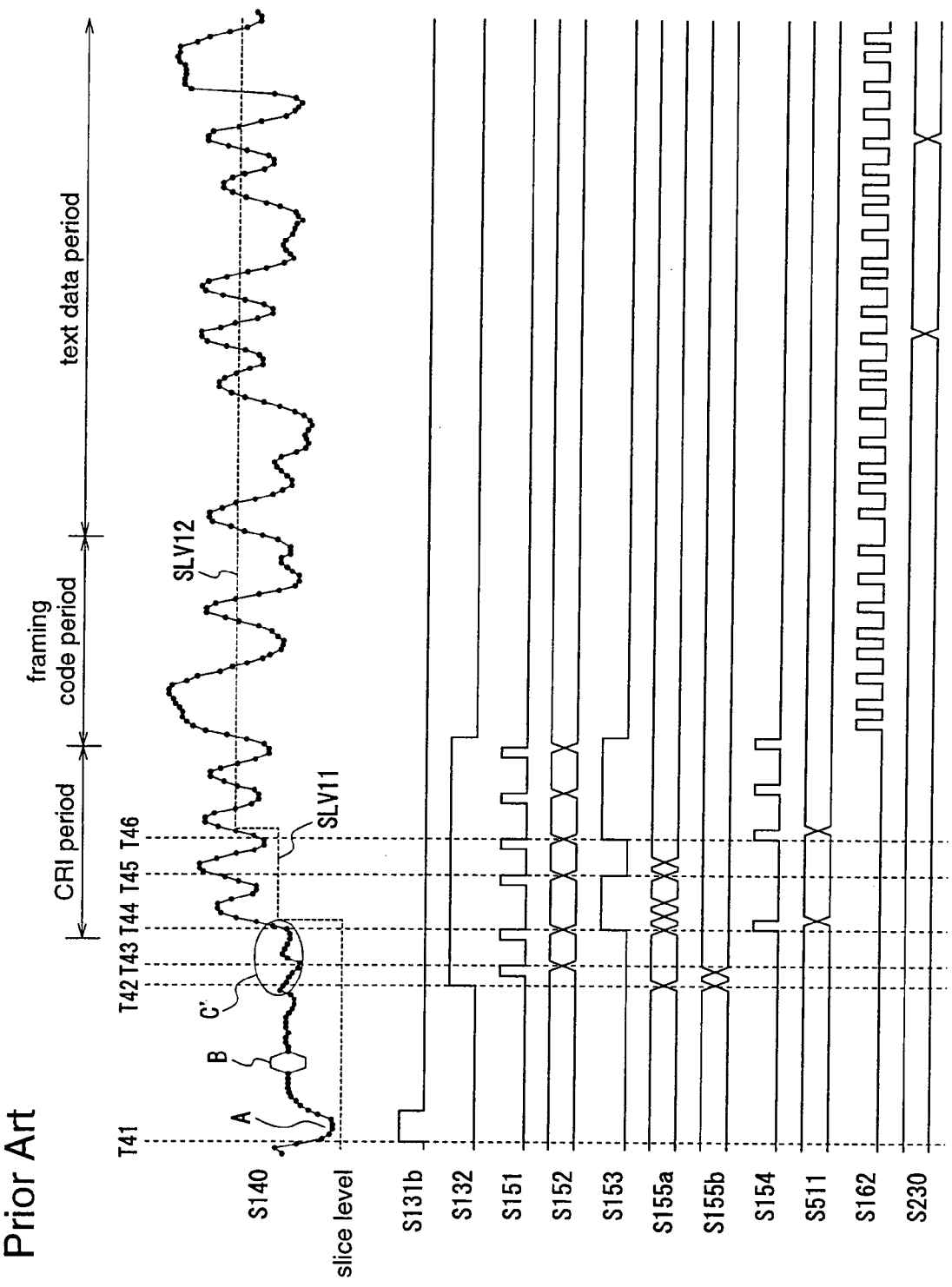
FIG. 12 is a timing chart showing an operation of the conventional data slicer in a case where an attenuated signal is inputted thereto.

FIG. 9 is a block diagram illustrating a construction of a data slicer 400 according to the fourth embodiment. In FIG. 9, the same or corresponding elements as those in FIG. 5 are denoted by the same reference numerals.

As shown in FIG. 9, the data slicer 400 according to the fourth embodiment includes a decoding circuit 420 that outputs decoded data S420a to S420 as well as a decoded data detection period gate pulse S420d while extracted serial data S163a to S163c are decoded; and a maximum/minimum retrieval circuit 411 that retrieves the maximum and minimum values of a digital video signal S140 while a CRI detection range signal S312 or the decoded data detection period gate pulse S420d is inputted, and outputs maximum value retrieval data S411a and minimum value retrieval data S411b. The data slicer 400 further includes a slice level calculation circuit 410 that includes, in addition to the components of the slice level calculation circuit 310 of the third embodiment, a decoded data unit pulse generation circuit 412 that generates a decoded data unit pulse S412 at intervals of decoded data unit on the basis of an extraction pulse S162 that is generated by an extraction pulse generation circuit 162 and the decoded data detection period gate pulse S420d; and a pulse selection circuit 413 that selects a frequency evaluation pulse S211a when the decoded data unit pulse S412 is not generated, while selecting the decoded data unit pulse S412 when the decoded data unit pulse S412 is generated, and outputs the selected pulse to an average/amplitude calculation circuit 311.

Here, the decoded data unit pulse generation circuit 412 counts the extraction pulse S162 during a period in which the decoded data detection period gate pulse S420d is inputted, and generates the decoded data unit pulse S412 at the intervals of decoded data unit. For example, when the decoded data is composed of 8 bits, the decoded data unit pulse generation circuit 412 counts the extraction pulse S162, and generates the decoded data unit pulse S412 at the intervals of 8 bit.

Next, the operation of the data slicer 400 that is configured as described above will be described.

When an analog video signal S110 upon which character broadcast serial data are superimposed is inputted through a video signal input terminal 110, the A/D converter 120 converts the analog video signal into a digital signal, and outputs the digital video signal S120 to the CRI detection unit 130 and the LPF 140. Then, the LPF 140 eliminates noises from the digital video signal S120, and outputs a resultant digital video signal S140 to the slice level calculation unit 410 and the data slicing unit 160. The CRI detection unit 130 generates a CRI detection range signal S132 on the basis of a vertical sync signal S131a and a horizontal sync signal S131b which are separated from the digital video signal S120, and outputs the generated CRI detection range signal S132 to the slice level calculation unit 410.

When the digital video signal 140 and the CRI detection range signal S132 are inputted, the slice level calculation unit 410 starts calculation of a slice level. The maximum/minimum retrieval circuit 411 retrieves the maximum and minimum values of the digital video signal S140, and outputs maximum value retrieval data S411a and minimum value retrieval data S411b. The falling detection circuit 151 detects the first falling and the second falling of the digital video signal S140, and outputs falling detection pulses S151. As the frequency of the digital video signal S140, which is calculated on the basis of the falling detection pulses S151, is a frequency corresponding to a predetermined character broadcast system, the frequency evaluation circuit 153 outputs a frequency evaluation gate pulse S153 to the CRI evaluation circuit 211. The CRI evaluation circuit 211 generates a frequency evaluation pulse S211a on the basis of the frequency evaluation gate pulse S153 and the falling detection pulse S151, and outputs the generated frequency evaluation pulse S211a to the pulse selection circuit 413. Since a decoded data unit pulse S412 is not inputted to the pulse selection circuit 413 at this time, the pulse selection circuit 413 selects the frequency evaluation pulse S211a, and outputs the selected pulse to the maximum/minimum retrieval circuit 411 and the maximum/minimum detection circuit 213.

The maximum/minimum detection circuit 213 samples the maximum value retrieval data S411a and the minimum value retrieval data S411b using the frequency evaluation pulse S211a as a load pulse, thereby to detect the maximum and minimum values of the digital video signal S140, and outputs maximum value detection data S213a and minimum value detection data S213b. Thereafter, the maximum/minimum retrieval circuit 411 resets the retrieved data, and retrieves maximum and minimum values of the digital video signal S140 that is inputted during a new period. The average/amplitude calculation circuit 311 calculates the amplitude of the digital video signal S140 on the basis of the maximum value detection data S213a and the minimum value detection data S213b, and outputs the calculated amplitude to the amplitude evaluation circuit 312 as the amplitude detection data S311b.

As the amplitude detection data S311b has the amplitude of the CRI signal C, the amplitude evaluation circuit 312 outputs an amplitude evaluation gate pulse S312. The CRI evaluation circuit 211 outputs the amplitude evaluation pulses S211b that are obtained by extracting pulses of the CRI signal C from the frequency evaluation pulses S211a in accordance with the amplitude evaluation gate pulse S312, to the average/amplitude calculation circuit 311.

When the amplitude evaluation pulse S211b is inputted, the average/amplitude calculation circuit 311 calculates the amplitude and the average amplitude of the digital video signal S140 from the maximum value detection data S213a and the minimum value detection data S213b, and outputs the calculated average amplitude to the data slicing unit 160 as reference slice level data S311a, and the amplitude to the slice level offset value calculation circuit 157 as amplitude level data S311c. The slice level offset value calculation circuit 157 calculates an offset value from the amplitude level data S311c, and outputs upper slice level data S157a that is obtained by adding the offset value to the reference slice level data S311a and lower slice level data S157b that is obtained by subtracting the offset value from the reference slice level data S311a.

When the falling detection circuit 151 detects the next falling of the CRI signal C and generates the falling detection pulse S151, the same processing is carried out using the generated falling detection pulse S151, and the average/amplitude calculation circuit 311 calculates the amplitude of the CRI signal and the average amplitude. Then, the average/amplitude calculation circuit 311 calculates the average value between the average amplitude of the CRI signal C and the previously-calculated reference slice level data, and updates the reference slice level data S311a on the basis of the calculated value. Similarly, the average/amplitude calculation circuit 311 calculates the average value between the amplitude of the CRI signal C and the previously-calculated amplitude level data, and updates the amplitude level data S311c on the basis of the calculated value. The slice level offset value calculation circuit 157 calculates an offset value from the amplitude level data S311c, and outputs the upper slice level data S157a and the lower slice level data S157b which are obtained by providing the offset to the reference slice level data S311a.

When the digital video signal S140 including a framing code signal D is inputted to the data slicing unit 160, the binarization circuit 161 binarizes the digital video signal S140 using the upper slice level data S157a, the reference slice level data S311a, and the lower slice level data S157b, thereby generating binarized data S161a to S161c, respectively. The extraction pulse generation circuit 162 generates an extraction pulse S162, and outputs the extraction pulse S162 to the extraction circuit 163 and the decoded data unit pulse generation circuit 412. The extraction circuit 163 extracts character broadcast serial data from the binarized data S161a to S161c in accordance with the extraction pulse S162, and outputs extracted serial data S163a to S163c. The decoding circuit 420 converts these extracted serial data S163a to S163c into parallel data, and detects the framing code. Further, the decoding circuit 420 outputs the decoded data detection period gate pulse S420d to the maximum/minimum retrieval circuit 411 and the decoded data unit pulse generation circuit 412 during a period in which the decoding process is carried out.

When the decoded data detection period gate pulse S420d is inputted to the maximum/minimum retrieval circuit 411, the maximum/minimum retrieval circuit 411 retrieves the maximum and minimum values of the digital video signal S140, and outputs maximum value retrieval data S411a and minimum value retrieval data S411b.

On the other hand, when the extraction pulse S162 and the decoded data detection period gate pulse S420d are inputted to the decoded data unit pulse generation circuit 412, the decoded data unit pulse generation circuit 412 counts the extraction pulse S162, and outputs a decoded data unit pulse S412 at intervals of data unit. Then, the pulse selection circuit 413 selects the decoded data unit pulse S412, and outputs the selected pulse to the maximum/minimum detection circuit 213 and the maximum/minimum retrieval circuit 411.

The maximum/minimum detection circuit 213 samples the maximum value retrieval data S411a and the minimum value retrieval data S411b using the decoded data unit pulse S412 as a load pulse, thereby to detect the maximum and minimum values of the digital video signal S140, and outputs maximum value detection data S213a and minimum value detection data S213b. Further, when the decoded data unit pulse S412 is inputted to the maximum/minimum retrieval circuit 411, the maximum/minimum retrieval circuit 411 resets the retrieved data, and retrieves maximum and minimum values of the digital video signal S140 in a new period. Then, the average/amplitude calculation circuit 311 outputs the average amplitude of the digital video signal S140, which is calculated from the maximum value detection data S213a and the minimum value detection data S213b, to the slice level offset value calculation circuit 157 and the data slicing unit 160 as reference slice level data S311a, and the calculated amplitude to the slice level offset value calculation circuit 157 as amplitude level data S311c. The slice level offset value calculation circuit 157 calculates an offset value from the amplitude level data S311c, and outputs upper slice level data S157a that is obtained by adding the offset value to the reference slice level data S311a, and lower slice level data S157b that is obtained by subtracting the offset value from the reference slice level data S311a.

When the digital video signal S140 including a text data signal E is inputted to the data slicing unit 160, the binarization circuit 161 binarizes the digital video signal S140 using the upper slice level data S157a, the reference slice level data S311a, and the lower slice level data S157b, like in the case including the framing code signal D, thereby to generate binarized data S161a to S161c, respectively. Then, the extraction circuit 163 extracts character broadcast serial data from the binarized data S161a to S161c in accordance with the extraction pulse S162, and outputs extracted serial data S163a to S163c. The decoding circuit 420 converts the extracted serial data S163a to S163c into parallel data, then performs a decoding process according to the type of the character broadcast indicated by the framing code, and outputs decoded data S420a to S420c. The decoding circuit 420 further outputs the decoded data detection period gate pulse S420d to the maximum/minimum retrieval circuit 411 and the decoded data unit pulse generation circuit 412 during a period in which the decoding process is carried out. Then, the decoded data selection circuit 182 selects decoded data including no decoding error from among the decoded data S420a to S420c in accordance with the decoded data selection signal S321a, and outputs the selected data as final decoded data S182. When detecting an error in the final decoded data S182, the error detection circuit 321 outputs an error detection signal S321b to the error count circuit 331. The controller 332 detects an optimum CRI amplitude evaluation value on the basis of error count data S331 that is obtained by counting decoding errors in accordance with the error detection signal S321b, and outputs the optimum amplitude evaluation value S332 to the slice level calculation unit 410. Then, the amplitude evaluation circuit 312 updates the CRI amplitude evaluation value in accordance with the optimum amplitude evaluation value S332.

On the other hand, when the decoded data detection period gate pulse S420d is inputted to the maximum/minimum retrieval circuit 411, the maximum/minimum retrieval circuit 411 retrieves the maximum and minimum values of the digital video signal S140 including the text data signal E, and outputs maximum value retrieval data S411a and minimum value retrieval data S411b. Further, the pulse selection circuit 413 selects the decoded data unit pulse S412 that is outputted from the decoded data unit pulse generation circuit 412, and outputs the selected pulse S412 to the maximum/minimum detection circuit 213 and the maximum/minimum retrieval circuit 411. The maximum/minimum detection circuit 213 samples the maximum value retrieval data S411a and the minimum value retrieval data S411b using the decoded data unit pulse S412 as a load pulse, and outputs maximum value detection data S213a and minimum value detection data S213b. The maximum/minimum retrieval circuit 411 resets the retrieved data in accordance with the decoded data unit pulse, and retrieves maximum and minimum values of the digital video signal S140 in a new period. The average/amplitude calculation circuit 311 calculates reference slice level data S311a and amplitude level data S311c on the basis of the maximum value detection data S213a and the minimum value detection data S213b. The slice level offset value calculation circuit 157 calculates upper slice level data S157a and lower slice level data S157b on the basis of an offset value that is calculated on the basis of the amplitude level data S311c.

Then, the binarization circuit 161 binarizes the digital video signal S140 using the reference slice level data S311a, the upper slice level data S157a, and the lower slice level data S157b which are set on the basis of the digital video signal S140 including the text data signal E, thereby to generate binarized data S161a to S161c, respectively. The extraction circuit 163 extracts character broadcast serial data from the binarized data S161a to S161c, and then the decoding circuit 420 performs a decoding process for extracted serial data S163a to S163c which are outputted from the extraction circuit 163 and outputs decoded data S420a to S420c. Then, the decoded data selection circuit 182 selects decoded data including no decoding error from among the decoded data S420a to S420c in accordance with the decoded data selection signal S321a, and outputs the selected data as final decoded data S182. When detecting an error in the final decoded data S182, the error detection circuit 321 outputs an error detection signal S321b to the error count circuit 331. The controller 332 detects an optimum CRI amplitude evaluation value on the basis of the error count data S331 that is obtained by counting decoding errors by the error count circuit 331, and outputs an optimum amplitude evaluation value S332 to the slice level calculation unit 410. Then, the amplitude evaluation circuit 312 updates the CRI amplitude evaluation value in accordance with the optimum amplitude evaluation value S332.

As described above, according to the data slicer 400 of the fourth embodiment, the maximum/minimum retrieval circuit 411 retrieves not only the maximum and minimum values of the CRI signal C, but also the maximum and minimum values of the framing code signal D and the text data signal E, thereby to perform the slice level calculation not only using the CRI signal C but also using the framing code signal D and the text data signal E. Therefore, even when the shapes of signals after the CRI signal would change, slice level data corresponding to the respective signal shapes can be calculated, thereby further suppressing the occurrence rate of decoding errors.

What is claimed is:
1. A data slicer comprising:
an A/D conversion unit for converting an input signal including data which are transmitted in serial, into a digital signal;
a slice level data calculation unit for calculating plural pieces of slice level data for binarizing the digital signal, on the basis of the digital signal;
a binarization unit for binarizing the digital signal using the plural pieces of slice level data, to be converted into plural binarized signals;
an extraction pulse generation unit for generating an extraction pulse to be used for extracting the data from the binarized signals;

an extraction unit for extracting the data from the binarized signals in accordance with the extraction pulse, thereby generating plural pieces of serial data;

a decoding unit for decoding the plural pieces of serial data, thereby generating plural pieces of decoded data; and a decoded data selection unit for selectively outputting decoded data including no error, from among the plural pieces of decoded data.

2. The data slicer of claim 1 wherein the input signal is a signal having a reference waveform of a predetermined cycle, said data slicer includes:
   a maximum/minimum retrieval unit for retrieving maximum and minimum values of the digital signal; and
   a reference cycle detection unit for determining whether a cycle of the digital signal is the cycle of the reference waveform or not, and said slice level data calculation unit calculates the plural pieces of the slice level data on the basis of an average value and an amplitude of the digital signal, which are calculated from the maximum and minimum values when the reference waveform cycle is detected.

3. The data slicer of claim 2 wherein the slice level data calculation unit employs the calculated average value as reference slice level data, and calculates upper slice level data by adding an offset value that is decided on the basis of the calculated amplitude, to the reference slice level data, and lower slice level data by subtracting the offset value from the reference slice level data.

4. The data slicer of claim 1 wherein the input signal is a signal of character broadcast that is transmitted being superimposed upon a vertical blanking interval of a video signal.

5. A data slicer comprising:

an A/D conversion unit for converting an input signal of a predetermined cycle and amplitude, including data which are transmitted in serial, into a digital signal;

a reference cycle detection unit for determining whether a cycle of the digital signal is the predetermined cycle or not;

a maximum/minimum retrieval unit for retrieving maximum and minimum values of the digital signal;

an amplitude evaluation unit for determining whether an amplitude of the digital signal, which is calculated from the retrieved maximum and minimum values, is the predetermined amplitude or not;

a slice level data calculation unit for calculating plural pieces of slice level data on the basis of an average value and an amplitude of the digital signal, which are calculated from the maximum and minimum values at a time when the predetermined cycle and amplitude are detected;

a binarization unit for binarizing the digital signal using the plural pieces of slice level data, to be converted into plural binarized signals;

an extraction pulse generation unit for generating an extraction pulse to be used for extracting the data from the binarized signals;

an extraction unit for extracting the data from the plural binarized signals in accordance with the extraction pulse, thereby generating plural pieces of serial data;

a decoding unit for decoding the plural pieces of serial data, thereby generating plural pieces of decoded data;

a decoded data selection unit for detecting an error from the plural pieces of decoded data, and selectively outputting one of the decoded data when errors are detected from all of the decoded data, or decoded data including no error when there are decoded data in which no error is detected;

an error count unit for counting errors in the data outputted from the decoded data selection unit; and a controller for controlling the evaluation in the amplitude evaluation unit on the basis of the output from the error count unit.

6. The data slicer of claim 5 wherein the input signal includes a reference waveform for calculating the slice level data, said data slicer includes a reference waveform detection unit for detecting the reference waveform, the reference cycle detection unit evaluates the cycle of the digital signal in a period when the reference waveform is detected, the maximum/minimum retrieval unit retrieves the maximum and minimum values of each cycle in the period when the reference waveform is detected, and the amplitude evaluation unit determines whether the amplitude calculated from the maximum and minimum values in each cycle is the predetermined amplitude or not.

7. The data slicer of claim 6 wherein the slice level data calculation unit employs the average value as reference slice level data, decides an offset value on the basis of the amplitude calculated by the amplitude calculation unit, and calculates upper slice level data by adding the offset value to the reference slice level data and lower slice level data by subtracting the offset value from the reference slice level data.

8. The data slicer of claim 7 wherein when calculating the average value from the maximum and minimum values, the slice level data calculation unit carries out an averaging process for the calculated average value and the reference slice level data that has been calculated in a previous cycle, and updates the reference slice level data on the basis of the obtained average value.

9. The data slicer of claim 7 wherein when the predetermine cycle and amplitude are detected, the slice level data calculation unit carries out an averaging process for the predetermined amplitude and an amplitude of the previous cycle, and decides the offset value on the basis of the obtained average amplitude.

10. The data slicer of claim 5 wherein the input signal includes a reference waveform for calculating the slice level data, a unit of the data is composed of predetermined bits;

said data slicer includes:
   a reference waveform detection unit for detecting the reference waveform;
   a data unit detection unit for outputting a data unit detection pulse at intervals of the data unit, on the basis of the decoded data, the maximum/minimum retrieval unit retrieves the maximum and minimum values in each cycle in a period when the reference waveform is detected, while retrieving the maximum and minimum values in each data unit on the basis of the data unit detection pulse in a period when the decoded data are outputted, and the amplitude evaluation unit determines whether the amplitude calculated from the maximum and minimum values in each cycle or each data unit is the predetermined amplitude or not.

11. The data slicer of claim 5 wherein
the input signal is a signal of character broadcast that is transmitted being superimposed upon a vertical blanking interval of a video signal.

12. A data slicing method for binarizing an input signal of a predetermined cycle using slice level data that are calculated on the basis of the input signal, and extracting data included in the input signal, comprising:
   an A/D conversion step of converting the input signal that is transmitted in serial, into a digital signal;
   a reference cycle detection step of determining whether a cycle of the digital signal is the predetermined cycle or not;
   a maximum/minimum retrieval step of retrieving maximum and minimum values of the digital signal;
   a slice level data calculation step of calculating plural pieces of slice level data on the basis of an average value and an amplitude of the digital signal, which are calculated from the maximum and minimum values at a time when the predetermined cycle is detected;
   a binarization step of converting the digital signal into plural binarized signals using the plural pieces of slice level data;
   a data extraction step of extracting data in accordance with an extraction pulse for extracting data from the binarized signals, thereby generating plural pieces of serial data;
   a decoding step of decoding the plural pieces of serial data, thereby generating plural pieces of decoded data; and
   a decoded data selection step of determining the presence or absence of errors in the decoded data, and selectively outputting decoded data including no error.

13. The data slicing method of claim 12 wherein
in the slice level data calculation step, the average value is employed as reference slice level data, an offset value is decided on the basis of the amplitude, then upper slice level data is calculated by adding the offset value to the reference slice level data, and lower slice level data is calculated by subtracting the offset value from the reference slice level data.

14. A data slicing method for binarizing an input signal of a predetermined cycle and amplitude using slice level data which are calculated on the basis of the input signal, and extracting data included in the input signal, comprising:
   an A/D conversion step of converting the input signal that is transmitted in serial, into a digital signal;
   a reference cycle detection step of determining whether a cycle of the digital signal is the predetermined cycle or not;
   a maximum/minimum retrieval step of retrieving maximum and minimum values of the digital signal;
   an amplitude evaluation step of determining whether an amplitude of the digital signal, which is calculated from the retrieved maximum and minimum values is the predetermined amplitude or not;
   a slice level data calculation step of calculating plural pieces of slice level data on the basis of an average value and an amplitude of the digital signal, which are calculated from the maximum and minimum values at a time when the predetermined cycle and amplitude are detected;
   a binarization step of converting the digital signal into plural binarized signals using the plural pieces of slice level data;
   a data extraction step of extracting data from the plural binarized signals in accordance with an extraction pulse for extracting data, thereby generating plural pieces of serial data;
   a decoding step of decoding the plural pieces of serial data, thereby generating plural pieces of decoded data;
   a decoded data selection step of detecting errors in the plural pieces of decoded data, and selectively outputting one of the decoded data when errors are detected from all of the decoded data, or decoded data including no error when there are decoded data in which no error is detected; and
   an amplitude evaluation control step of counting errors in the decoded data selected in the decoded data selection step, and controlling the evaluation in the amplitude evaluation step on the basis of the number of errors.

* * * * *